(12) United States Patent
Lind, Jr. et al.

(10) Patent No.: US 8,888,035 B2
(45) Date of Patent: Nov. 18, 2014

(54) MORPHING AIRCRAFT

(75) Inventors: Richard Charles Lind, Jr., Gainesville, FL (US); Daniel Thurmond Grant, Gainesville, FL (US); David Eaton, Fort Walton Beach, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 494 days.

(21) Appl. No.: 13/061,019

(22) PCT Filed: Aug. 25, 2009

(86) PCT No.: PCT/US2009/054917
§ 371 (c)(1),
(2), (4) Date: Feb. 25, 2011

(87) PCT Pub. No.: WO2010/027801
PCT Pub. Date: Mar. 11, 2010

(65) Prior Publication Data
US 2011/0155840 A1    Jun. 30, 2011

Related U.S. Application Data

(60) Provisional application No. 61/091,476, filed on Aug. 25, 2008.

(51) Int. Cl.
*B64C 39/02*    (2006.01)
*B64C 37/00*    (2006.01)
*B60F 3/00*    (2006.01)
*B64C 1/00*    (2006.01)

(52) U.S. Cl.
CPC .............. *B64C 39/024* (2013.01); *B64C 37/00* (2013.01); *B64C 2201/022* (2013.01); *B64C 2001/0045* (2013.01); *B60F 3/00* (2013.01); *B64C 2201/102* (2013.01); *B64C 2201/108* (2013.01); *B64C 2201/027* (2013.01)

USPC .............................................. 244/13; 244/49

(58) Field of Classification Search
USPC ........ 244/3.27, 17.11, 49; 446/36–45, 73, 75, 446/76, 231, 56; 215/400, DIG. 1; 89/1.81
See application file for complete search history.

(56) References Cited

U.S. PATENT DOCUMENTS 4,688,743 A     8/1987   Eickmann
4,714,444 A  *  12/1987  Rendel ........................... 446/61
(Continued)

OTHER PUBLICATIONS

International Search Report and Written Opinion dated Apr. 6, 2010 for PCT/US2009/054917.

(Continued)

*Primary Examiner* — Philip J Bonzell
*Assistant Examiner* — Michael Kreiner
(74) *Attorney, Agent, or Firm* — Fleit Gibbons Gutman Bongini & Bianco PL; Jon A. Gibbons

(57) ABSTRACT

A morphing aircraft that is achieves multi-modality location and camouflage for payload emplacement The morphing aircraft includes a substantially cylindrical fuselage including a shape configured as a packaging container with a first end and a second end A set of wings is coupled to the fuselage The set of wings includes a first position where the set of wings is extended outwards from the fuselage and a second position where the set of wings is retracted inwards towards the fuselage A tail is coupled to the second end of the cylindrical fuselage The tail includes a first position where the tail is extended outward from the fuselage and a second position where the tail is retracted inward towards the fuselage A propeller is mounted to the first end of the fuselage An engine is mechanically coupled to the propeller The engine is enclosed within the fuselage and powers the propeller.

28 Claims, 28 Drawing Sheets

(56) References Cited

U.S. PATENT DOCUMENTS

| | | | |
|---|---|---|---|
| 8,528,761 B2 * | 9/2013 | Yarro et al. | 215/382 |
| 2005/0014439 A1 | 1/2005 | Erickson et al. | |
| 2005/0242236 A1 | 11/2005 | Purcell | |
| 2007/0018033 A1 | 1/2007 | Fanucci et al. | |

OTHER PUBLICATIONS

International Preliminary Report on Patentability dated Mar. 1, 2011 for PCT/US2009/054917.

* cited by examiner

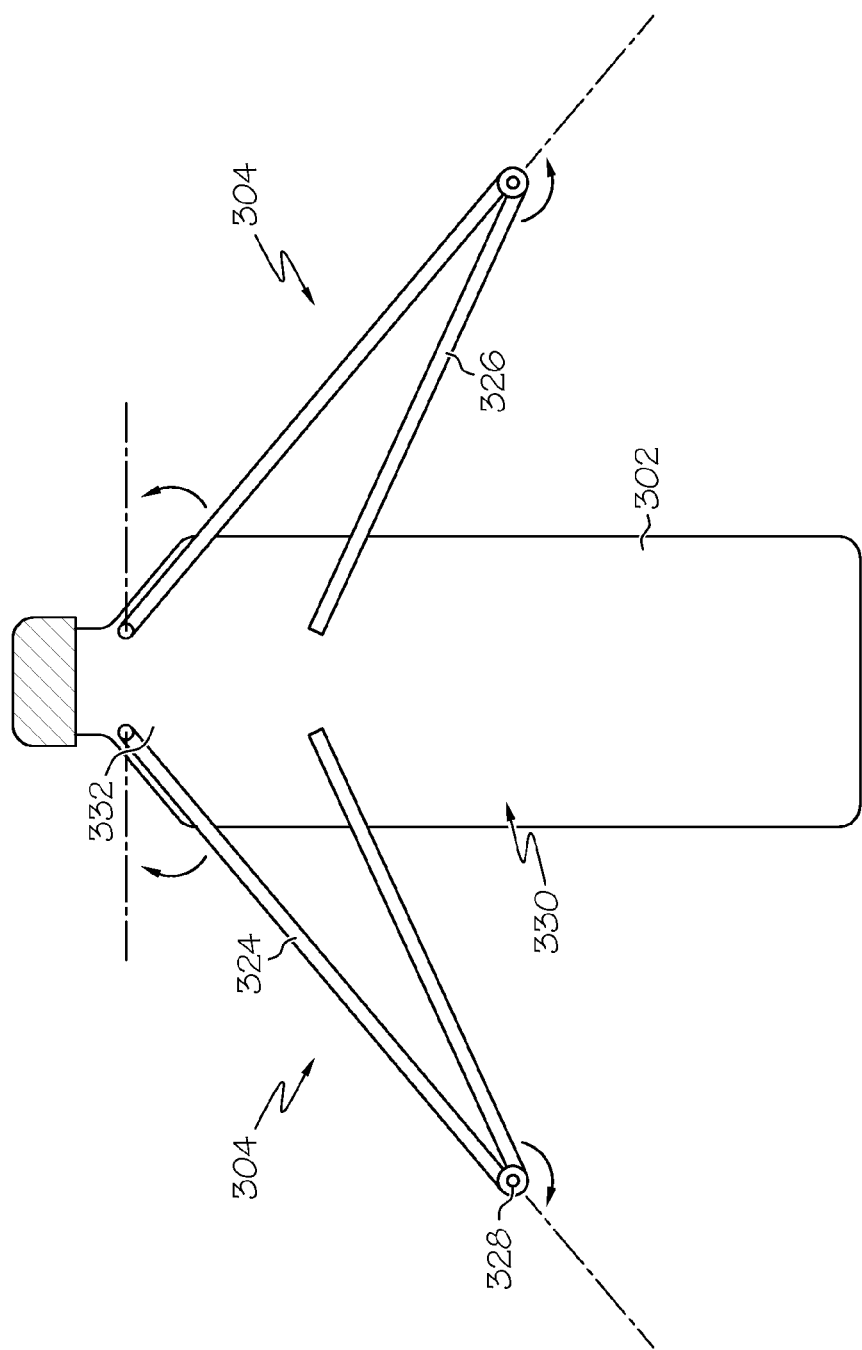

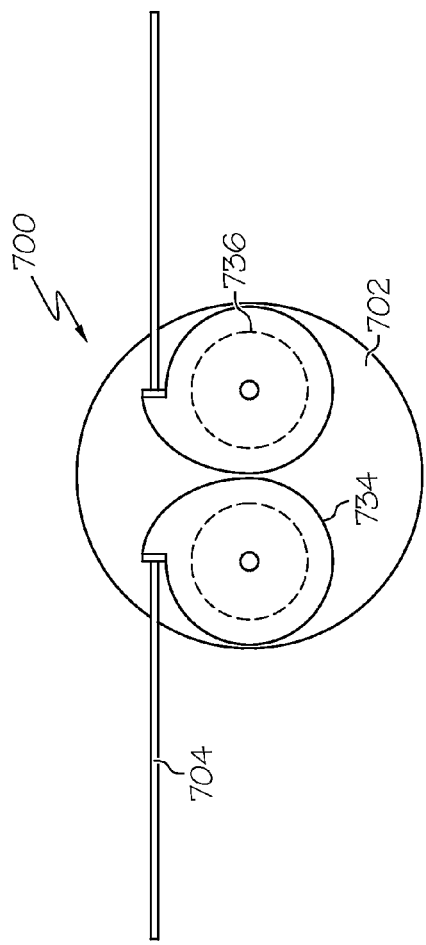
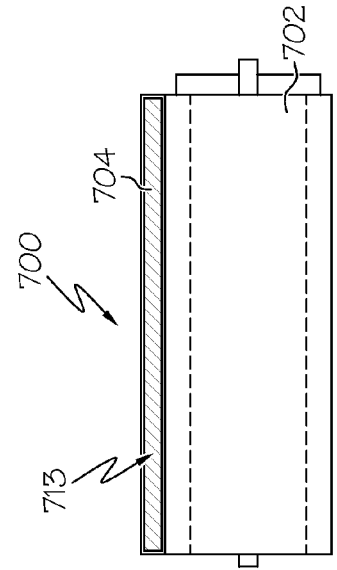
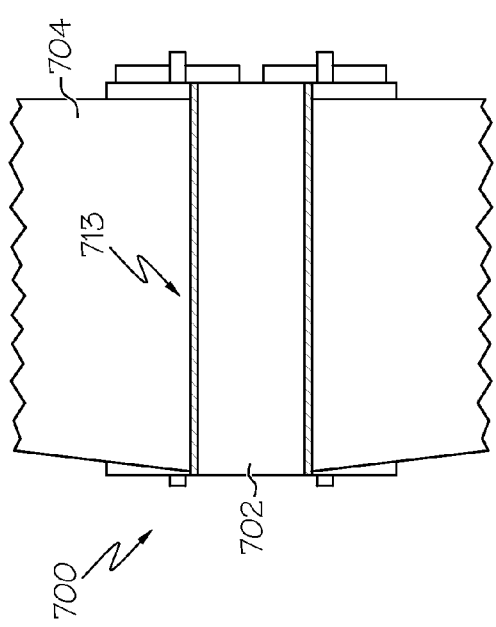

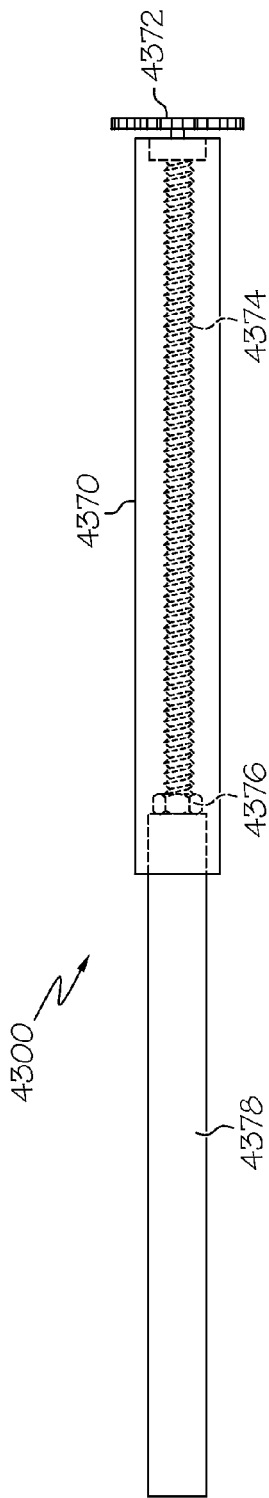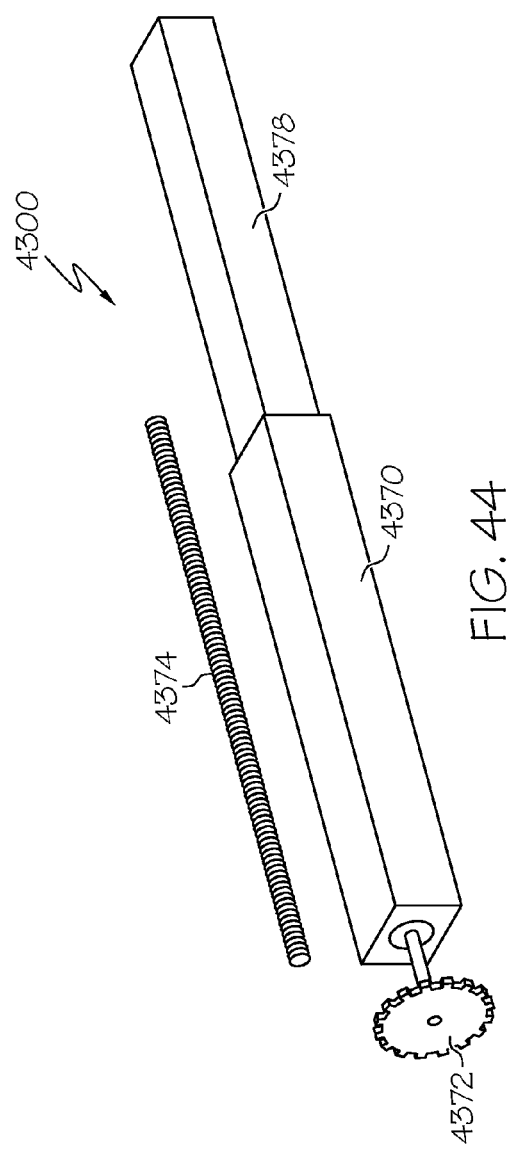

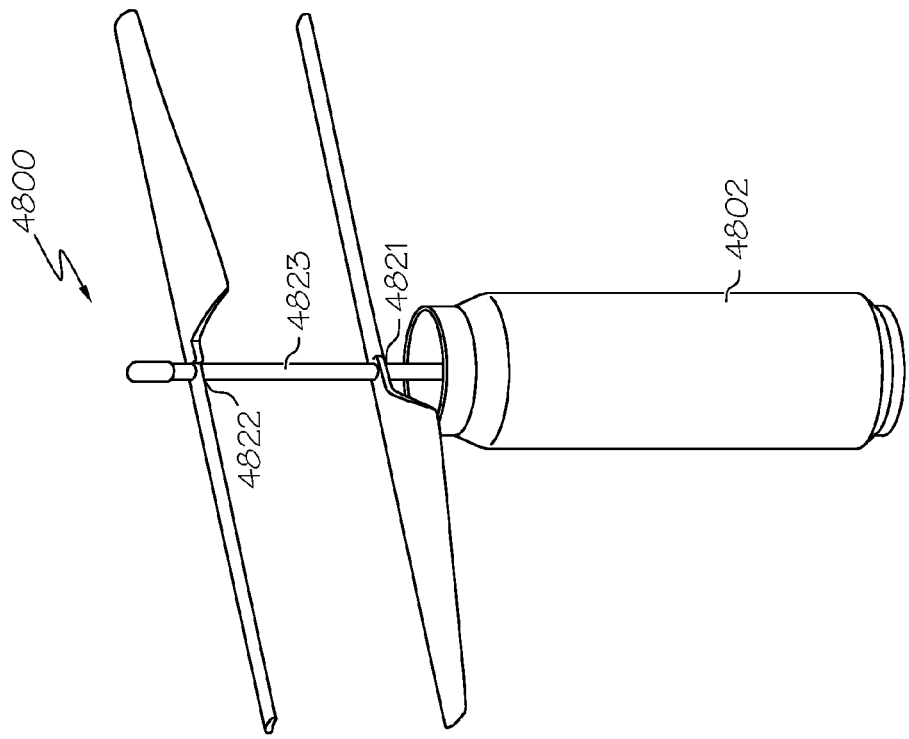
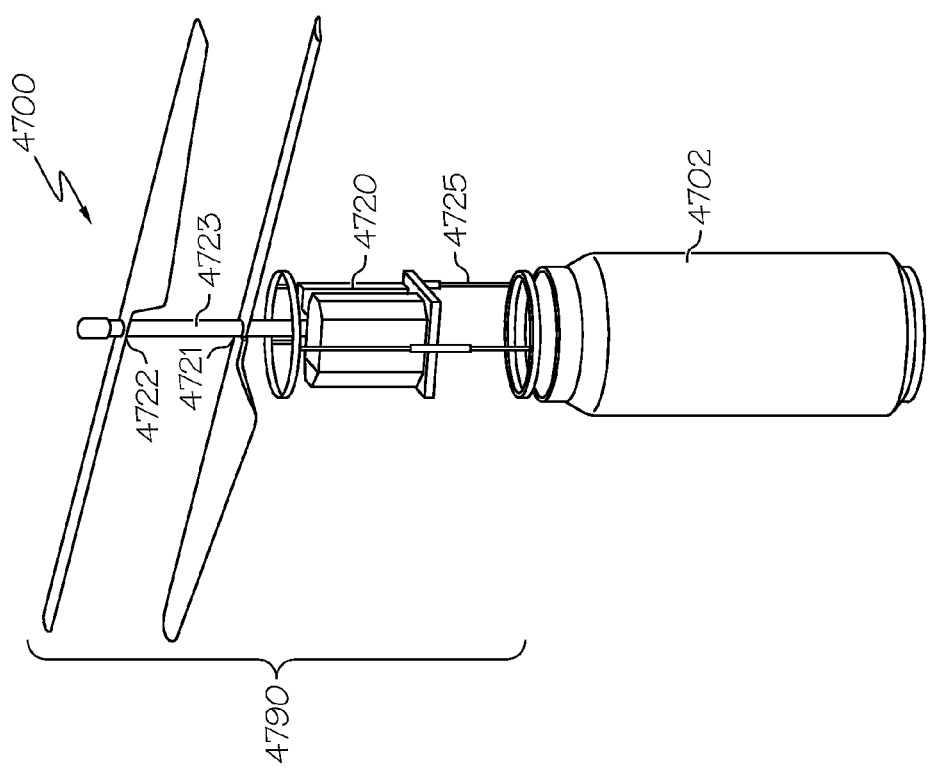

MORPHING AIRCRAFT

CROSS-REFERENCE TO RELATED APPLICATIONS

This application is based upon and claims priority from prior U.S. Provisional Patent Application No. 61/091,476, filed on Aug. 25, 2008 the entire disclosure of which is herein incorporated by reference.

FIELD OF THE INVENTION

The present invention generally relates to unmanned aerial vehicles (UAV), and more particularly relates to transformable UAVs.

BACKGROUND OF THE INVENTION

Remote control or autonomously unpiloted aircraft have been used for years. These aircraft are often referred to as UAVs or Unmanned Aerial Vehicles. UAVs are used by the military for surveillance, reconnaissance, engagement, and the like. They are also used in many civil applications such as police, firefighting, and bomb squad environments where human participant would be at risk. UAVs are equipped with sensors and cameras to detect sounds, images, chemicals, temperature, vibration, light, velocity, Doppler shift, and even biological matter.

UAVs are available in a variety of shapes, sizes and configurations, and characteristics using various engines including electric-powered engines, gas-powered engines and jet-powered engines to allow for controlled sustained levels of flight. When utilizing a UAV it is important to evade detection in applications such as surveillance and reconnaissance. Unfortunately, conventional UAVs are difficult to place in various environments such as urban environments without being detected. Once a UAV is detected by a human, aircraft, robot, or the like, the UAV loses its effectiveness.

SUMMARY OF THE INVENTION

A morphing aircraft that is achieves multi-modality location and camouflage for payload emplacement. In one embodiment, an unmanned aerial vehicle is disclosed. The unmanned aerial vehicle comprises a substantially cylindrical fuselage comprising a shape configured as a packaging container with a first end and a second end. A set of wings is coupled to the fuselage. The set of wings comprises a first position where the set of wings is extended outwards from the fuselage and a second position where the set of wings is retracted inwards towards the fuselage. A tail is coupled to the second end of the cylindrical fuselage. The tail comprises a first position where the tail is extended outward from the fuselage and a second position where the tail is retracted inward towards the fuselage. A propeller is mounted to the first end of the fuselage. An engine is mechanically coupled to the propeller. The engine is enclosed within the fuselage and powers the propeller.

In another embodiment, a rotary-wing unmanned aerial vehicle is disclosed. The rotary-wing unmanned aerial vehicle comprises a substantially cylindrical fuselage comprising a shape configured as a packaging container with a first end and a second end. At least one rotor is coupled to the first end. The at least one rotor comprises a first position where the at least one rotor is extended outwards from the fuselage and a second position where the at least one rotor is retracted inwards towards the fuselage. An engine is mechanically coupled to the at least one rotor, wherein the engine is enclosed within the fuselage and powers the at least one rotor.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 3 shows one example of an unmanned aerial vehicle comprising a multi-joint wing in a fix-wing aircraft for extending and retracting into the fuselage according to one embodiment of the present invention;

FIGS. 7-9 shows various examples of an unmanned aerial vehicle comprising canister wings extending and retracting into a fuselage according to one embodiment of the present invention;

FIGS. 43-44 shows various examples of a drive shaft comprising extending and retracting components to fit within a container for an unmanned aerial vehicle and to work cooperatively with an insert such as that shown in FIG. 11 according to one embodiment of the present invention;

FIG. 47 shows one example of a rotary-wing aircraft with the rotor extended outside a packaging container according to one embodiment of the present invention;

FIG. 48 shows one example of a rotary-wing aircraft with the rotor extended and a motor and other avionics inside a packaging container according to one embodiment of the present invention;

DESCRIPTION OF THE PREFERRED EMBODIMENTS

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention. Moreover, some statements may apply to some inventive features but not to others. In general, unless otherwise indicated, singular elements may be in the plural and vice versa with no loss of generality.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms "bottle", "beverage container", "container", "can", and the like are used interchangeably herein to refer to any a portable container or box or package for holding liquids and solids. In one embodiment, the container characteristically has a neck and mouth and typically made of plastic or aluminum. However, this is only one example of a container applicable to various embodiments of the present invention. It should be noted that a container is not limited to having a neck and/or a mouth and being made of plastic or aluminum.

Various embodiments of the present invention have many advantages over conventional UAVs. One or more embodiments of the present invention provide a UAV that can transform or morph and into a common object that does not look like an aircraft and therefore avoids detection. This transformation is repeatable several times during the mission.

Prior Art Fixed-Wing Aircraft

Figure 1:
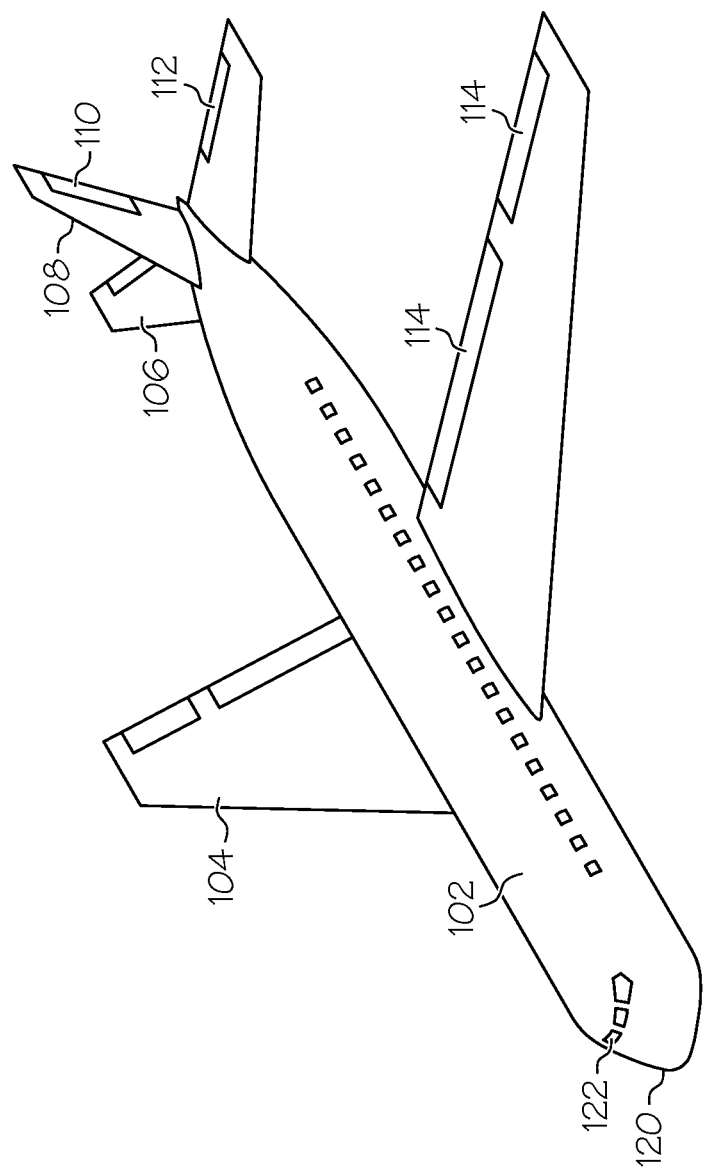
FIG. 1 is a generalized diagram of a fix-wing aircraft according to the prior art.

FIG. 1 is a generalized diagram of a fix-wing aircraft 100 according to prior art. The fuselage or body 102 of the aircraft 100 holds various items and payloads. Attached to either side of the fuselage 102 is a set of wings 104 that provides most of the lift for the fix-wing aircraft 100. A set of horizontal stabilizers 112 for controlling pitch or wings 106 are typically attached to the rear portion of the fuselage 102, although there are designs with other placements. A vertical stabilizer 108 for controlling yaw is attached to the rear portion of the fuselage 102, and again there is known designs with other placements and designs that combine the function of the wing 106, horizontal stabilizers 112, and vertical stabilizer 108. In many common designs a set of elevators 110 to adjust pitch is hinged to the vertical stabilizer and a set of flaps 114 is hinged to the wings 104 change lift and drag is hinged each wing 104.

Morphing Fixed Wing UAV

Figure 2:
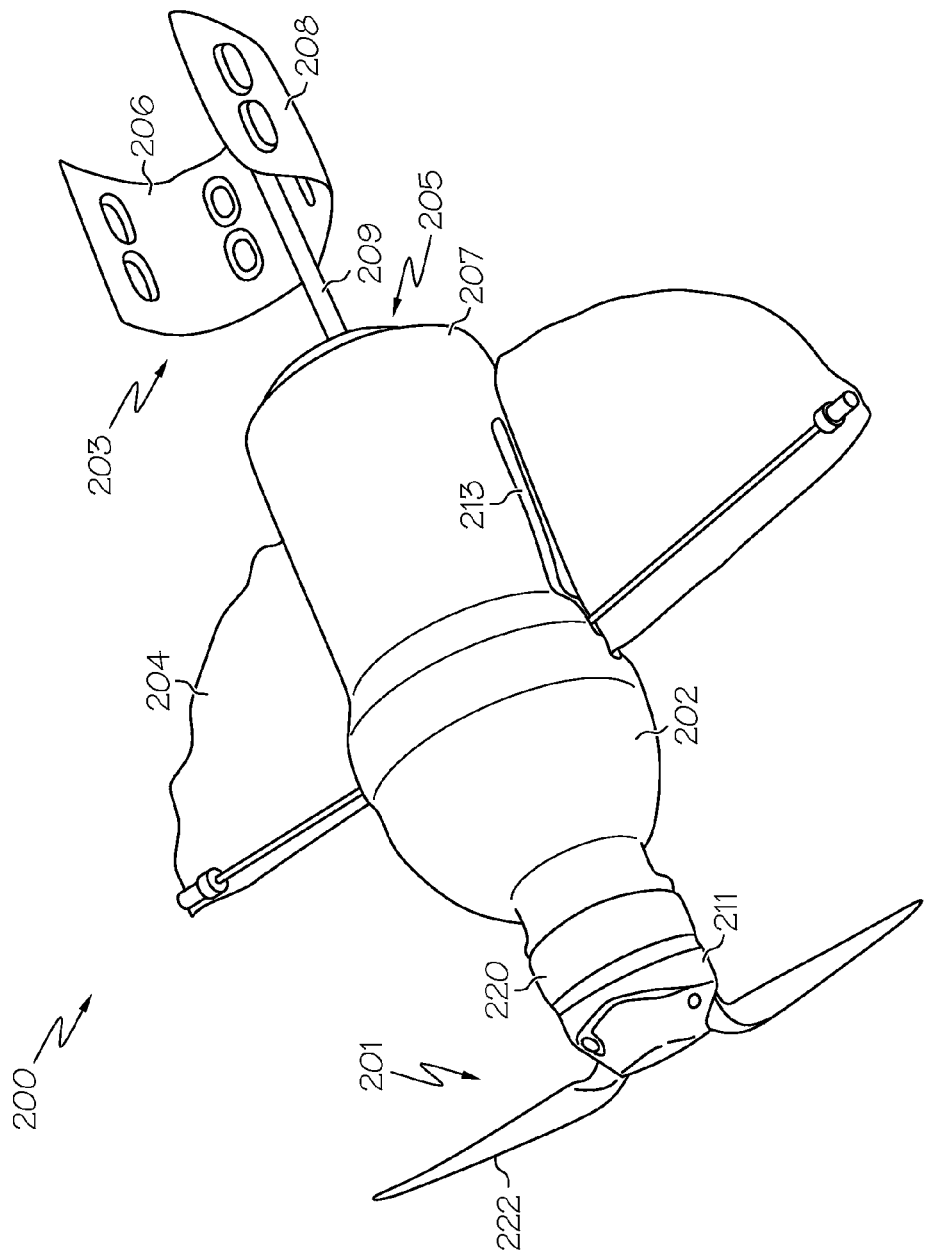
FIG. 2 shows one example of an unmanned aerial vehicle comprising wings and a propeller extended outside a packaging container according to one embodiment of the present invention.

FIG. 2 illustrates one embodiment of a morphable fixed-wing UAV 200. In particular, the embodiment of FIG. 2 comprises a morphable fixed-wing UAV 200 having wings and a propeller that extend outside a beverage container according to one embodiment of the present invention. In this embodiment, a beverage container such as a Gatorade® plastic bottle is used as a fuselage 202. It should be noted that various embodiments of the present invention are not limited to bottles or containers resembling bottles or cans. For example, other types of containers such as boxes, bags, other packaging containers, and the like can also be used as a morphable fixed-wing UAV.

The fuselage 202 is substantially cylindrical and configured in a shape of a beverage container with a first end 201 for a propeller and a second end 203 for horizontal 206 and vertical 208 stabilizers. The beverage container's external trade dress and lettering are designed to resemble a given consumer brand of beverage, which in this case a Gatorade® plastic bottle. In one embodiment, the fuselage is an actual consumer beverage container. In another embodiment, the material of the container/fuselage 202 is not limited to the material from which the actual container is generally made from. For example, a Gatorade® bottle is usually made from plastic. However, in some embodiments, the container 202 can comprise other materials such as metals, alloys, carbon fiber, other synthetic materials, and the like. In these embodiments, the container 202 comprises substantially the same shape, size, coloring, graphics, trade dress, and/or lettering of a given container such as a Gatorade® bottle. Therefore, the container 202 is made of materials that enhance the UAV 200, but maintains the appearance of the common container.

The embodiment of FIG. 2 shows a set of wings 204 that are extended outside the fuselage 202 along with horizontal stabilizer 206 and vertical stabilizer 208 mounted on an extension 209. The extension 209 extends from the second end 203 of the fuselage 202. In one embodiment, the extension 209 retracts into and extends out of an inner portion 205 of the fuselage 202. The horizontal stabilizer 206 and vertical stabilizer 208, in this embodiment, are bendable and/or foldable so that they are able to fit inside the inner portion 205 of the fuselage 202 when the extension 209 is retracted into the inner portion 205. Alternatively, the horizontal stabilizer 206 and vertical stabilizer 208 are configured to wrap around an outer portion 207 of the fuselage 202 when the extension 209 is retraced into the inner portion 205. In another embodiment, the horizontal stabilizer 206 and vertical stabilizer 208 are created from a portion of the fuselage 202. In this embodiment, the container/fuselage 202 comprises two or more pieces that separate from each other when the extension 209 is extended. One of these portions becomes the fuselage 202 and the other one of these portions becomes the horizontal stabilizer 206 and vertical stabilizer 208. In this embodiment, the extension 209 is coupled to the portion comprising the fuselage 202 and is also coupled to the other portion that is the horizontal stabilizer 206 and vertical stabilizer 208.

A propeller 222 is also shown coupled to the outside of the fuselage 202. In one embodiment, the propeller 222 is coupled to the first end 201 of the fuselage 202. In the example of FIG. 2, the propeller 222 is coupled to the cap 211 of the container which forms the fuselage 202. It should be noted that this is only an example and the propeller 222 can be coupled to other areas of the container as well. In one embodiment, the propeller 222 is formed from the cap 211. In another embodiment, the propeller 222 is a separate component that is configured to substantially resemble a cap 209 of the container and replaces the original cap 211 when in use.

It is important to note that when the UAV 200 is ready for flight the wings 204, extension 209 with the horizontal stabilizer 206 and vertical stabilizer 208 mounted thereon, and the propeller is configured at a first position as shown in FIG. 2. For example, the wings 204 are shown as being extended; the extension 209 is extended which configures the horizontal stabilizer 206 and vertical stabilizer 208 mounted on the extension 209 for flight; and the propeller is extended (e.g., the blades are extended).

In the case when the UAV is not flying, such as resting on the ground, the wings 204, the horizontal stabilizer 206 and the vertical stabilizer 208 mounted on the extension 209, and the propeller 222 retract internally into the fuselage in a second position. For example, the wings 204 retract through one or more areas 213 on the fuselage 202 and/or can fold/wrap around and/or adjacent to the fuselage 202. The extension 209 retracts into the fuselage 202 as discussed above. If the propeller 222 is formed from the container such as from the cap 209 and/or the another portion of the container, the propeller 222 can retract inside the fuselage 202 or fold around and/or adjacent to the fuselage 202. The propeller 222 can also be detachable as discussed above and replaced with an original part of the container such as the cap 209.

A motor 220 internal to the fuselage and mechanically coupled to the propeller 220 is also labeled. Other avionics, controls and sensors (not shown) as positioned inside the fuselage 202 include cameras, microphones, chemicals sensors, biological sensors, location sensors such as Global Positioning Satellite modules, heat sensors, and the like. The engine 202 can be an electric engine and/or a gas engine. In addition to these items, the morphable UAV 200 can also include various weapons such as explosives. The morphable UAV 200 can also include various evasion weapons such as flares, chaff, smoke, and the like. The morphable UAV 200 can also include tracking modules that can be dropped on or attached to a target for tracking.

The wings 204, horizontal and vertical stabilizers 106, 108, and propellers 222 are configured to extend and retract using a variety of mechanisms. FIGS. 3-11 illustrate a few embodiments used with a fixed winged UAV 200. To begin, FIG. 3 illustrates one embodiment of comprising a multi-joint wing 304 in a fix-wing UAV that extends and retracts into the fuselage 302. The multi-joint wing 304 is configured to fold into the container forming the fuselage 202 and then extend from the container. The multi-joint configuration allows the length of the wings 304 to be several times the overall length of the bottle and to be hidden to maintain the original appearance of the container.

In particular, FIG. 3 shows that each wing 304 comprises a first portion 324 and at least a second portion 326 that are pivotally coupled to each other via a pivoting mechanism 328. The second portion 326 can pivot/rotate in a direction that is away from or towards the fuselage 302. This decreases the length of the wing 304 and allows the wing 304 to retract into an internal portion 330 of the fuselage 302. The first portion 324 of the wing 304 is pivotably coupled to a portion 332 of the fuselage 302 and can pivot/rotate in a direction that is away from or towards the fuselage 302 as well.

Figure 4:
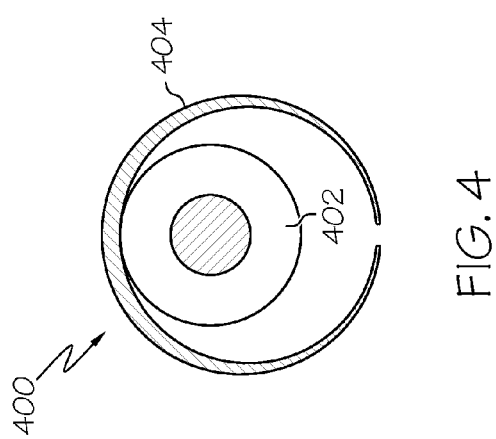

FIG. 4 illustrates another embodiment of a wing configuration. For example, FIG. 4 shows a foldable wing extending and retracting around the fuselage in a fix-wing UAV. The folding wing is designed to fold around the curvature of the container upon landing and then extend for flight. One example of a foldable wing is disclosed in U.S. Pat. No. 7,331,546, entitled Bendable Wing for Micro Air Vehicle, filed Aug. 25, 2006, with inventors Peter Ifju et al., and commonly assigned herewith to the University of Florida Research Foundation, Inc. and the teachings of which is hereby incorporated by reference in its entirety.

Figure 5:
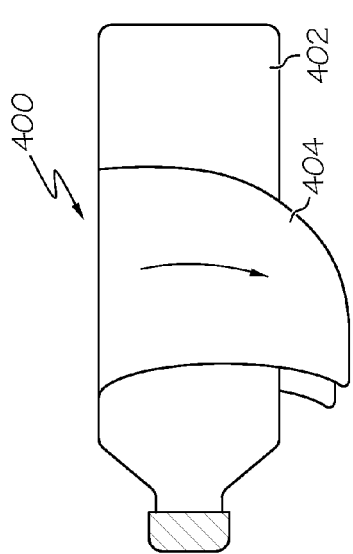
FIGS. 4-6 shows various example of an unmanned aerial vehicle comprising folding wings extending and retracting into a fuselage according to one embodiment of the present invention.
Figure 6:
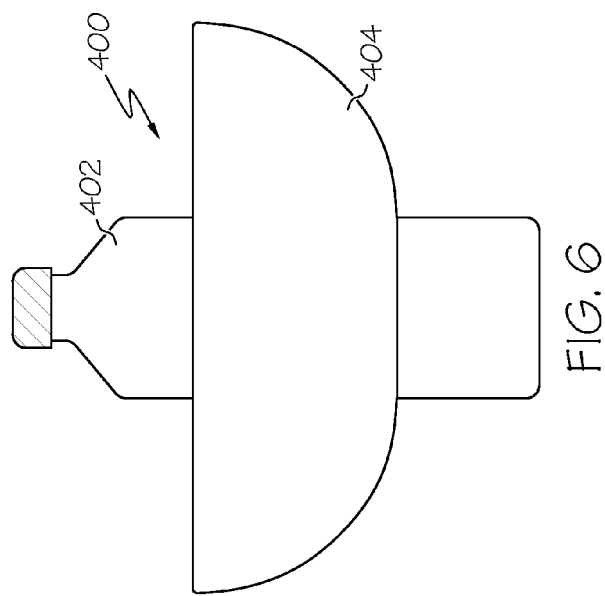

In particular, FIG. 4 shows a front view of the fuselage 402 of an UAV 400. The wings 404 comprise a foldable/bendable material that allows the wings 404 to fold around the container forming the fuselage 402. FIG. 5 shows a side view of the fuselage 402 with the wings 404 in a partially folded configuration. FIG. 6 shows a top of the fuselage 402 with the wings 404 in an extended position ready for flight. In one embodiment, the wings 404 comprise coloring, graphics, trade dress, and the like that substantially match and continue the design of the container forming the fuselage. For example, when the wings 404 are in a folded position, the coloring, graphics, trade dress, and the like of the wings 404 maintain the original appearance of the container.

FIG. 7 shows another embodiment of an extendable/retractable wing for a UAV 700. In particular, FIG. 7 shows a front cross-sectional view of a container forming a fuselage 702 with the wings 704 extended. FIG. 8 shows a top of the container forming a fuselage 702 with the wings 704 extended. In one embodiment, the wings 704 are canister wings or wings that "roll" inside of an internal mechanism 734 of the fuselage 702. In one embodiment, the wings 704 are mechanically coupled to a rolling/winding mechanism 736 that "rolls" or "winds" the wings 704 within the internal mechanism 734 that acts as a storage bin. The wings 704 enter the fuselage 702 through one or more areas 713. When the wings 704 are retracted into the fuselage 702 they can be extended either manually, for example, by pulling the wings 704 outwards from the fuselage 702 or the wings 704 can be automatically extended using a motor or other mechanical device. FIG. 9 shows the wings 704 retracted into the fuselage 702.

Figure 11:
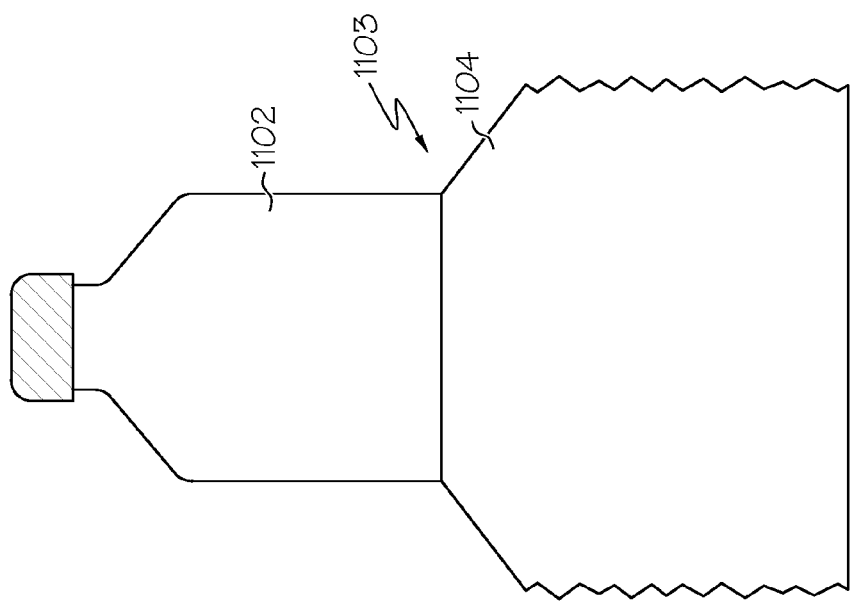
FIGS. 10-11 show various examples of an unmanned aerial vehicle comprising different wing locations on a fuselage according to one embodiment of the present invention.
Figure 10:
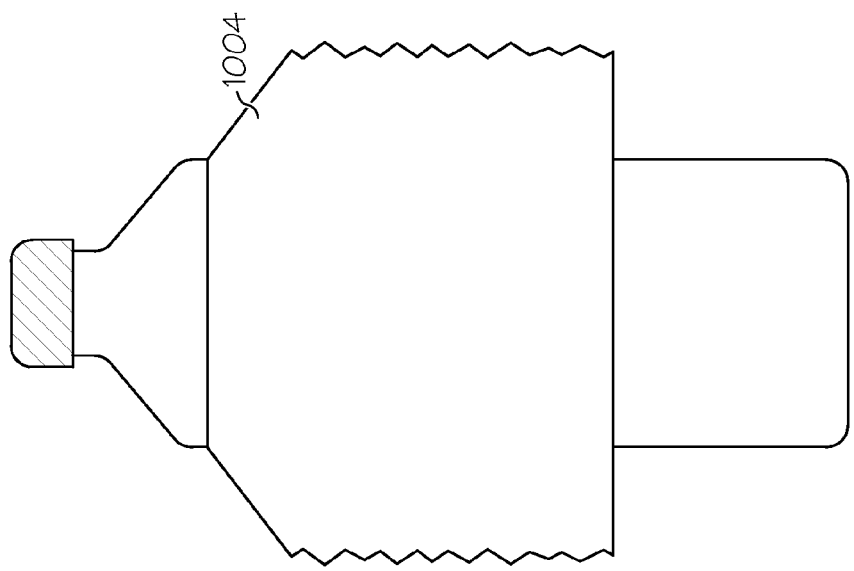

In all the embodiments discussed herein the wing location is not required to always be in a forward position as shown in FIG. 10. Other wing locations, such as a rear wing, are shown in FIGS. 10-11. For example, FIG. 11 shows a wing 1104 coupled to the second portion 1103 of the fuselage 1102. In this example, the second potion 1103 is a rear portion and the wing 1104 is a rear wing.

Figure 12:
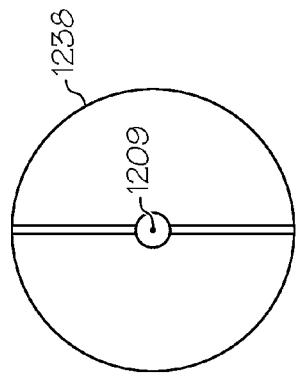

As with the wing, different tail configurations are within the true scope and spirit of various embodiments of the present invention. For example, FIGS. 12-15 illustrate various tail configurations in a fixed-wing UAV. In particular, FIG. 12 shows a front view of a circular tail 1238. In one embodiment, the circular tail 1238 is mechanically coupled to the extension 1209. When the extension 1209 is retracted into the fuselage 1202, the circular tail 1238 can either fold/bend to allow the tail to fit inside a container such as a beverage container forming the fuselage. The circular tail 1238, in one embodiment, fits the inner diameter of the bottle and can utilize the rounded surface area as both a vertical and horizontal tail.

If the circular tail 1209 is made from a rigid material, a hinged area 1240 can be included that allows the circular tail 1238 to fold. In another embodiment, the circular tail 1238 is formed from a bottom portion of the container forming the fuselage. In this embodiment, when the extension 1209 is retracted into the fuselage, the circular tail 1238 forms the bottom portion (e.g., the portion of the container that rests on the ground when the container is in an upright position.) of the container.

Figure 14:
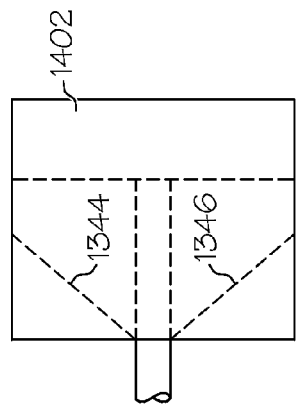
FIGS. 12-15 show various examples of different tail configurations for an unmanned aerial vehicle according to one embodiment of the present invention.
Figure 15:
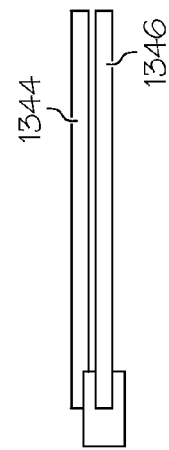
Figure 13:
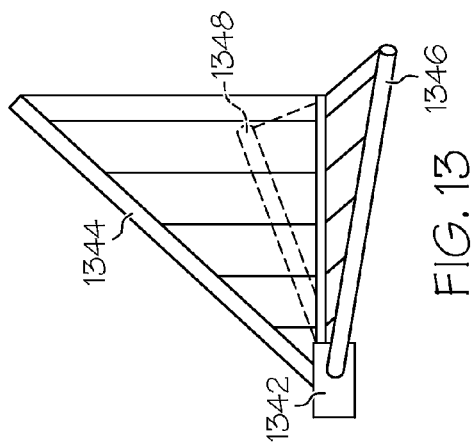

FIG. 13 illustrates an expandable tail 1340 comprising a spring loaded mechanism 1342. The spring loaded mechanism 1342, which can be coupled to the extension 1309, enables the arms 1344, 1346, 1348 of the tail 1342 to vary their position so that the tail 1342 is retractable as the tail 1342 is drawn into the container forming the fuselage 202. The spring loaded mechanism 1342 also enables the arms 1344, 1346, 1348 of the tail 1342 to vary their position so that the tail 1342 can be expanded into a conventional tail for flight when withdrawn from inside of the container forming the fuselage 202. The arms 1344, 1346, 1348 of the tail 1342 are able to be positioned to match the inner dimensions of the container forming the fuselage 1402, as shown in FIG. 14 or they can completely collapsed as shown in FIG. 15.

Figure 17:
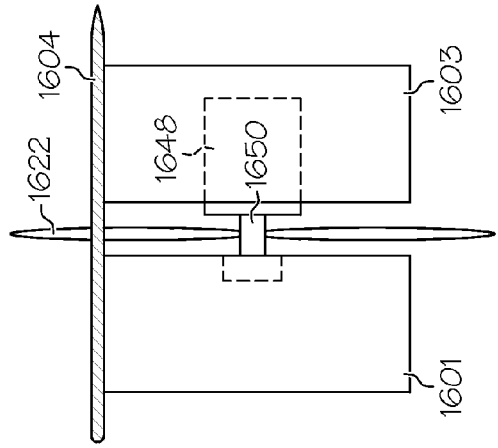
FIGS. 16-19 show various examples of different propeller mounts for an unmanned aerial vehicle according to one embodiment of the present invention.
Figure 19:
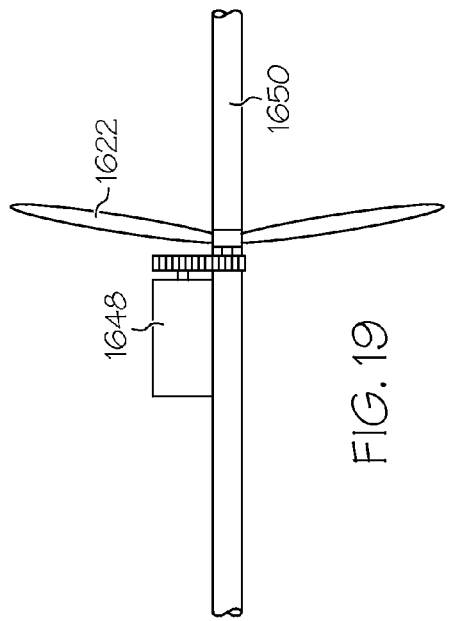
Figure 16:
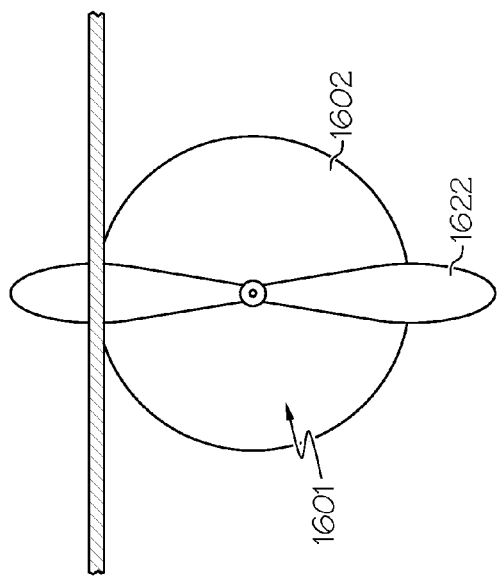
Figure 18:
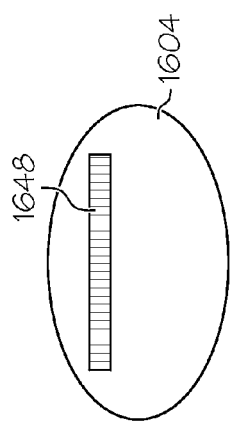

Turning now to propeller mounts, FIGS. 16-19 illustrate various alternative positions for a propeller where the propeller extends through an opening in the wing. For example, FIG. 16 shows a front view of the fuselage 1602. In particular, a propeller 1622 is coupled to the first portion 1601 of the fuselage 1602. Although, the propeller 1622 can also be coupled to a second portion or rear portion of the fuselage 1602 or anywhere in between (as shown in FIG. 17) as well. The wing 1604 resides at a position that extends over the propeller 1622 as shown in FIGS. 16 and 17. However, the wing 1604 comprises an opening 1648, as shown in FIG. 18, that allows the propeller 1622 to pass through the wing 804. For example, as a motor 1650 turns a drive shaft 1652, as shown in FIGS. 17 and 19, the propeller 1622 rotates and passes through the opening 1648 in the wing 1604.

Figure 22:
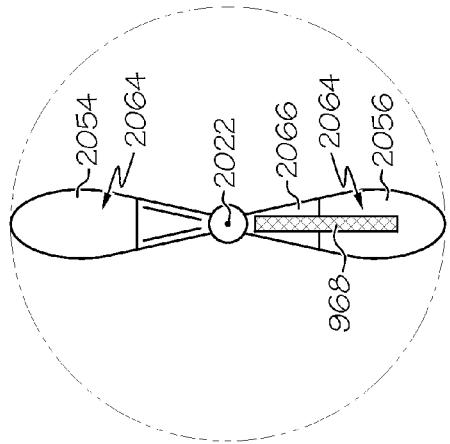
FIGS. 20-24 show various examples of different propellers for an unmanned aerial vehicle according to one embodiment of the present invention.
Figure 21:
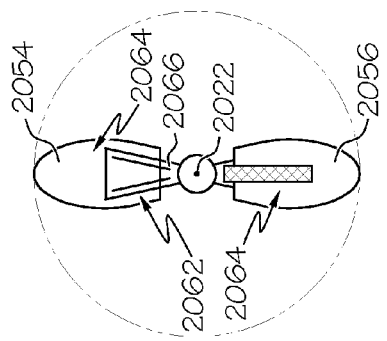
Figure 20:
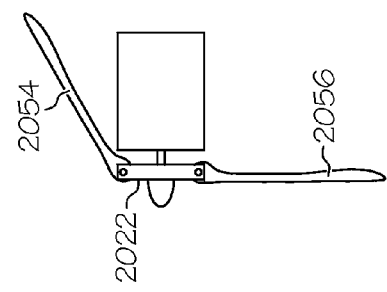
Figure 24:
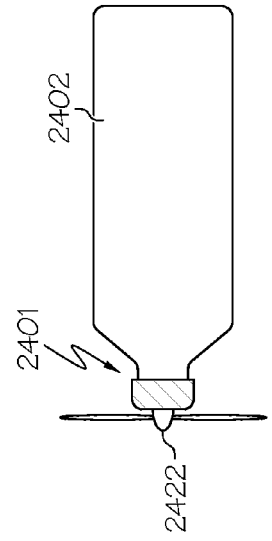
Figure 23:
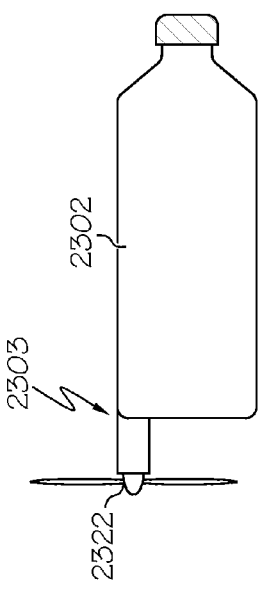

Different types of foldable and extendable propeller can be used as shown in FIGS. 20-24. For example, FIG. 20 illustrates a foldable propeller 2022 comprising foldable blades 2054, 2056. The foldable blades allow the propeller to fold, extend, or both upon increasing throttle. The centrifugal force acts on the propeller 2022 by bringing the blades 2054, 2056 out of a folded configuration into a flyable-configuration. In one embodiment, a hinged member 2058, 2060 pivotably coupled the blades 2054, 2056 to the propeller 2022. The extendable propeller 2022, in one embodiment, is converted by a runner-track system 2062, as shown in FIG. 21, that allows the outer section 2064 of a blade 2054 to slide over the inner section 2066 of the blade 2054. An elastic band 2068 also connects two sections 2064, 2066 of a blade 2054 for the purpose of inducing retraction, as shown in FIGS. 21 and 22. FIG. 23 shows a propeller 2322 positioned at a rear portion 2303 of a container forming the fuselage 2302. FIG. 24 shows a propeller 2422 positioned at a front portion 2401 of a container forming the fuselage 2402.

Figure 25:
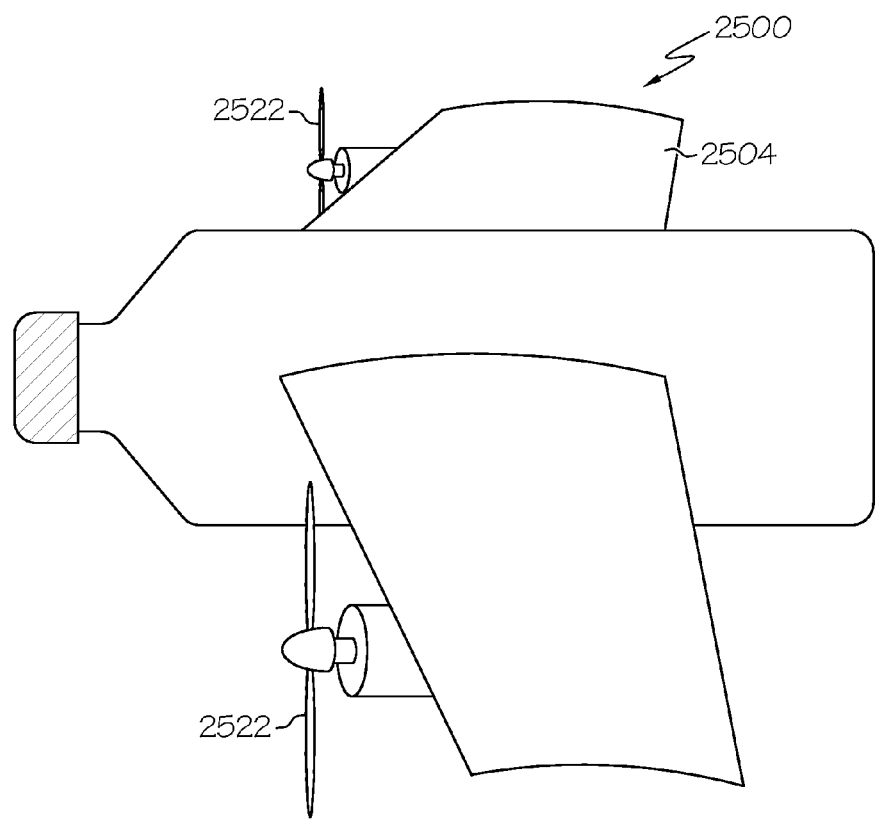
FIGS. 25 and 26 show examples of a an unmanned aerial vehicle comprising a set of wings each with a propeller mounted thereon according to one embodiment of the present invention.
Figure 26:
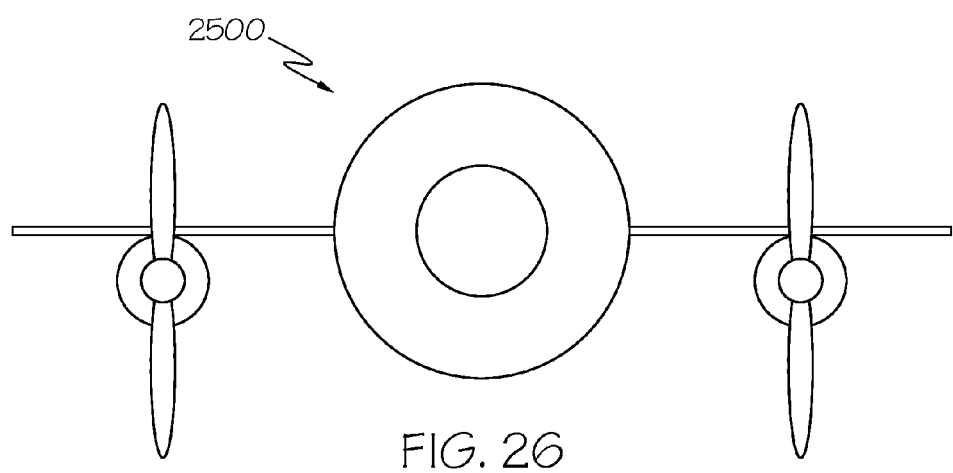

FIGS. 25 and 26 show another embodiment of a morphable UAV 2500. FIG. 25 shows a side view of the morphable UAV 2500 and FIG. 26 shows a front view of the morphable UAV 2500. The morphable UAV 2500 of FIGS. 25 and 26 comprise a plurality of propellers 2522, 2535 and associated motors. In one embodiment, each of the plurality of propellers 2522, 2535 are coupled to a respective wing 2504. The plurality of propellers 2522, 2535 provides more flight power and can be independently operated (e.g., one propeller can be operated at a slower speed than the other propeller) for controlling the yaw of the morphable UAV 2500.

Figure 27:
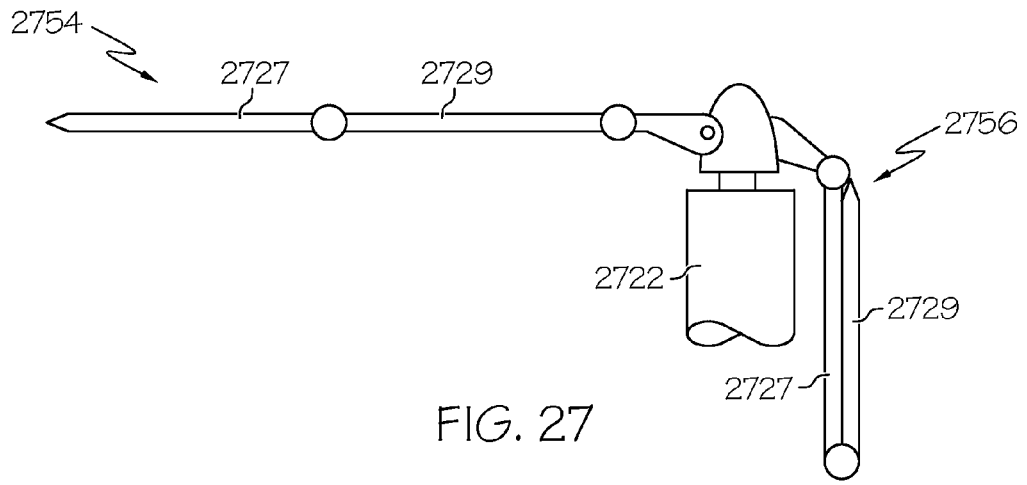
FIGS. 27-29 show various examples of propeller configurations according to one embodiment of the present invention.
Figure 28:
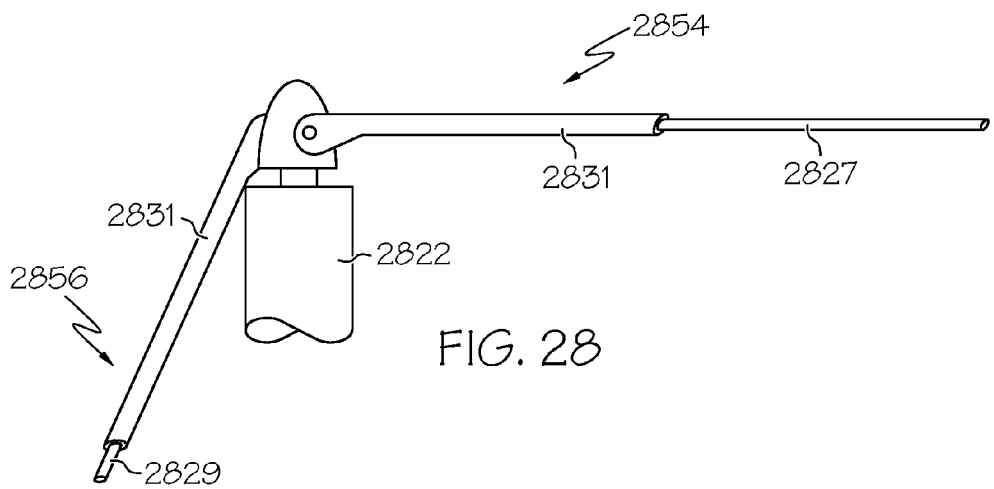
Figure 29:
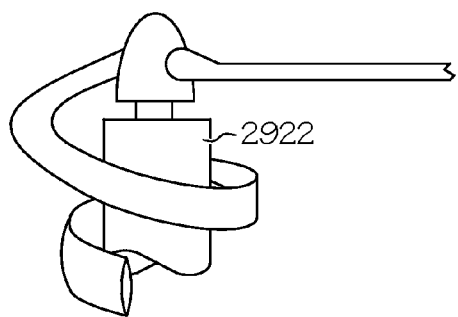

FIGS. 27-29 show additional embodiments for a propeller or a rotor. In particular, FIG. 27 shows the blades 2754, 2756 of a propeller/rotor 2722 comprising multiple hinged sections 2727, 2729. These multiple hinged sections 2727, 2729 are able to rotate/pivot and fold to decrease the size/length of the blades 2754, 2756 to fit inside of a container. As the propeller/rotor 2722 spins, the centripetal force extends the blades 2754, 2756 to full length.

FIG. 28 shows the blades 2854, 2856 of the propeller/rotor 2822 comprising one or more extendable/retractable sections 2827, 2829 that extends from/retracts into another section 2831 of the blade 2854, 2856. FIG. 29 shows a blade 2954, 2956 of the propeller/rotor 2922 comprising a bendable/foldable/resilient material. This blade 2954, 2956 is able to wrap around the propeller/rotor 2922 so that the propeller/rotor 2922 and blade 2954 can fit inside of a container. It should be noted that a combination of these blade types can be used as well.

Figure 30:
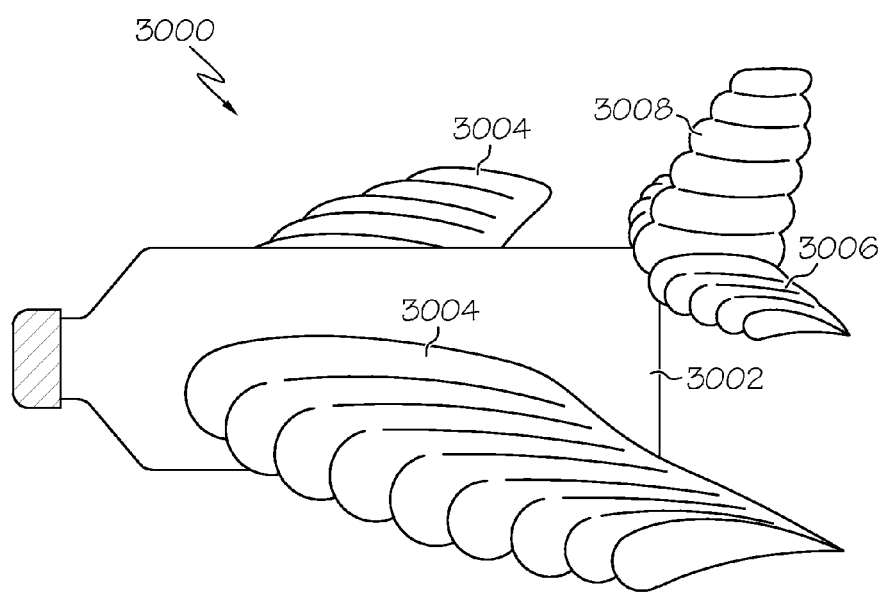
FIG. 30 shows one example of an unmanned aerial vehicle comprising inflatable wings and tail according to one embodiment of the present invention.

FIG. 30 shows a morphable UAV 3000 comprising inflatable wings 3004, horizontal stabilizers 3006, and vertical stabilizers 3008. In particular, the wings 3004, horizontal stabilizers 3006, and vertical stabilizers 3008 are stored within the container 3002 and can be manually and/or mechanically inflated. This inflation process causes the wings 3004, horizontal stabilizers 3006, and vertical stabilizers 3008 to extend out from the container 3002, as shown in FIG. 30. In one embodiment, an air cartridge can be included within (or outside of) the container 3002 to inflate the wings 3004, horizontal stabilizers 3006, and vertical stabilizers 3008. Once deflated, the wings 3004, horizontal stabilizers 3006, and vertical stabilizers 3008 can be stored within the container 3002.

Figure 31:
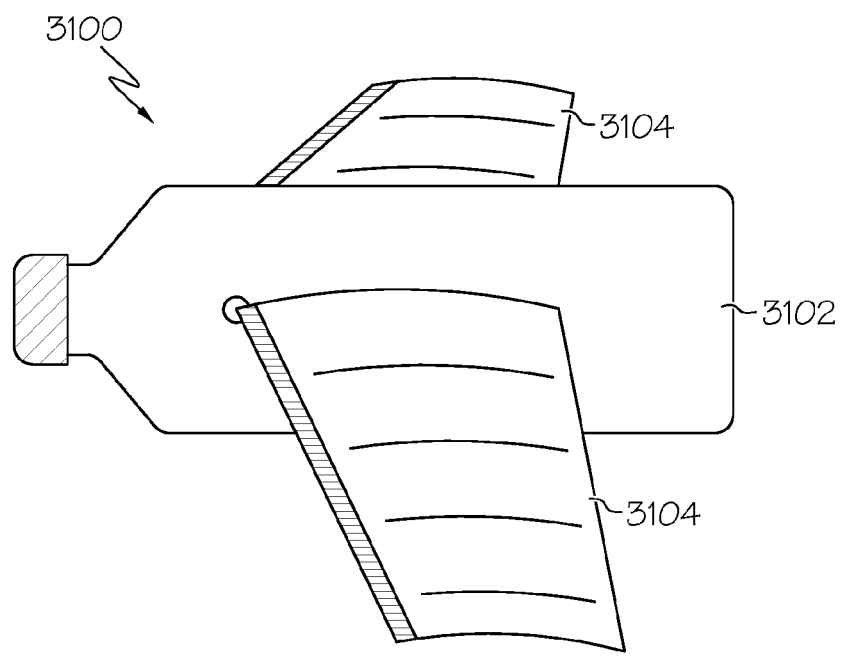
FIGS. 31-32 show various examples of an unmanned aerial vehicle comprising wings that can be converted into a sail according to one embodiment of the present invention.
Figure 32:
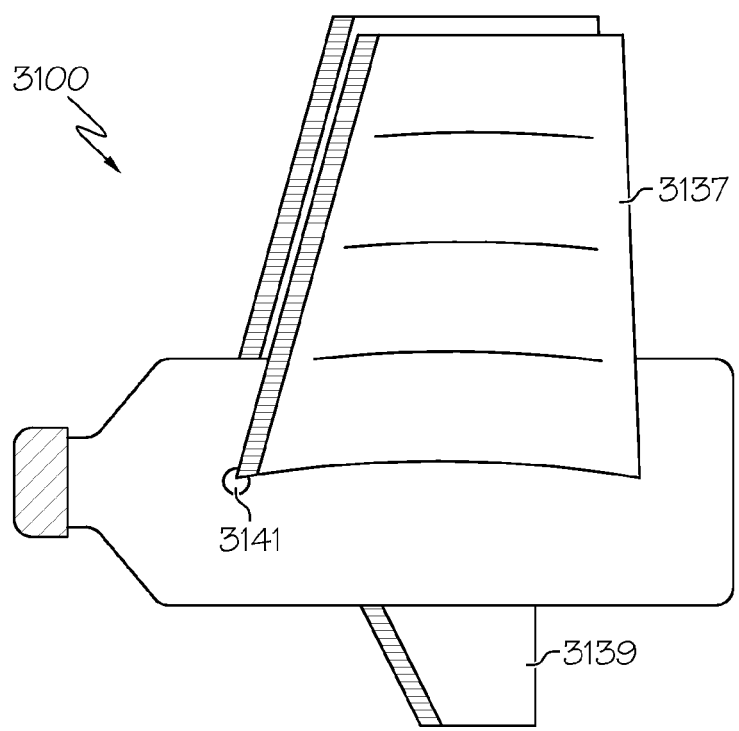

FIG. 31 shows another embodiment of a morphable UAV 3100. In particular, FIG. 31 shows a morphable UAV 3100 comprising a set of wings 3104 coupled to the container 3102. These wings 3102 are rotatable upwards, via one or more rotation mechanisms 3141, to create a sail 3137, as shown in FIG. 32. This allows the morphable UAV 3100 to be deployed in the air and then the water or vice versa. In one embodiment, a retractable keel 3139 can retract from within the container 3102 or from an outside portion of the container 3102 as well. This retractable keel 3139 can be used to stabilize the morphable UAV 3100 when in the water (or even in the air).

Figure 33:
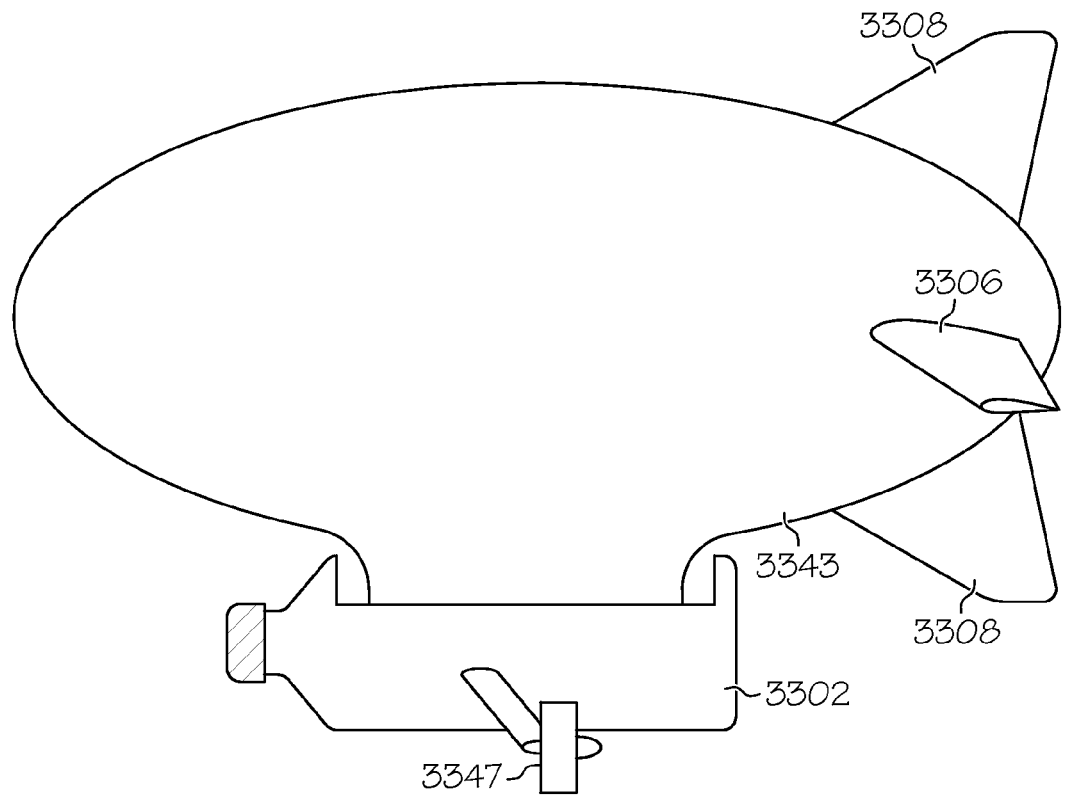
FIGS. 33-34 show various examples of an unmanned aerial vehicle that is configured as an airship according to one embodiment of the present invention.
Figure 34:
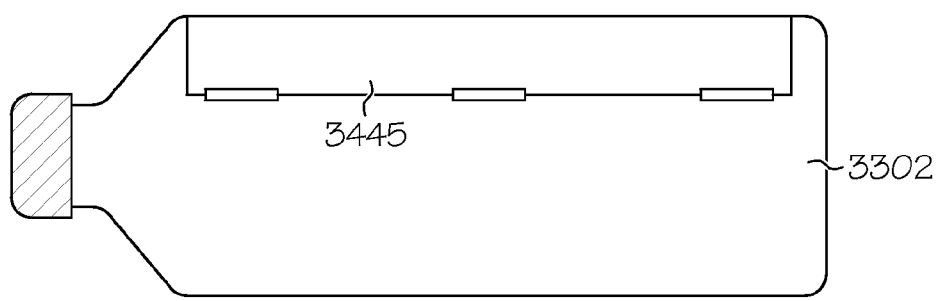

FIGS. 33-34 show yet another embodiment of a morphable UAV 3300. In particular, FIG. 33 shows a container 3302 morphed into an airship. The container 3300 comprises a bladder 3343 that is stored within the container 3302, as shown in FIG. 34. The bladder 3343 comprises horizontal stabilizers 3306 and vertical stabilizers 3308. The bladder 3343, horizontal stabilizers 3306, and vertical stabilizers 3308 can be manually and/or mechanically inflated. This inflation process causes the bladder 3343, horizontal stabilizers 3306, and vertical stabilizers 3308 to extend out from the container 3202, as shown in FIG. 32. In one example, the container 3302 comprises a hinged section 3445, as shown in FIG. 34, that opens up to allow the bladder 3343 to extend out from the container 3302. In one embodiment, an air cartridge can be included within (or outside of) the container 3202 to inflate the bladder 3343, horizontal stabilizers 3306, and vertical stabilizers 3308. Once deflated, the w bladder 3343, horizontal stabilizers 3306, and vertical stabilizers 3308 can be stored within the container 3302. A propeller similar to those discussed about can be coupled to the container 3302 or a nacelle 3347 can alternatively be used.

Figure 35:
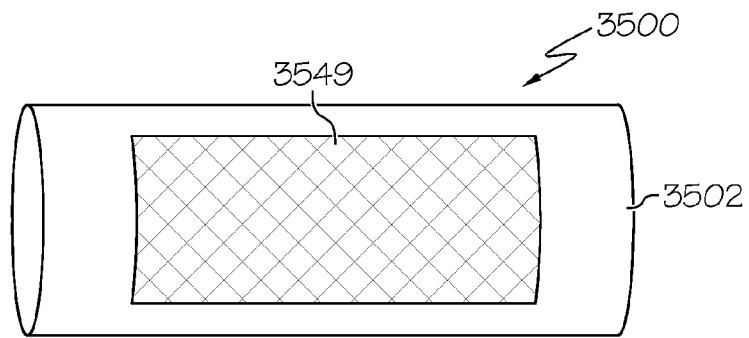
FIGS. 35-37 show various examples of a unmanned aerial vehicle comprising wings comprising wings formed from the container acting as the fuselage according to one embodiment of the present invention.
Figure 36:
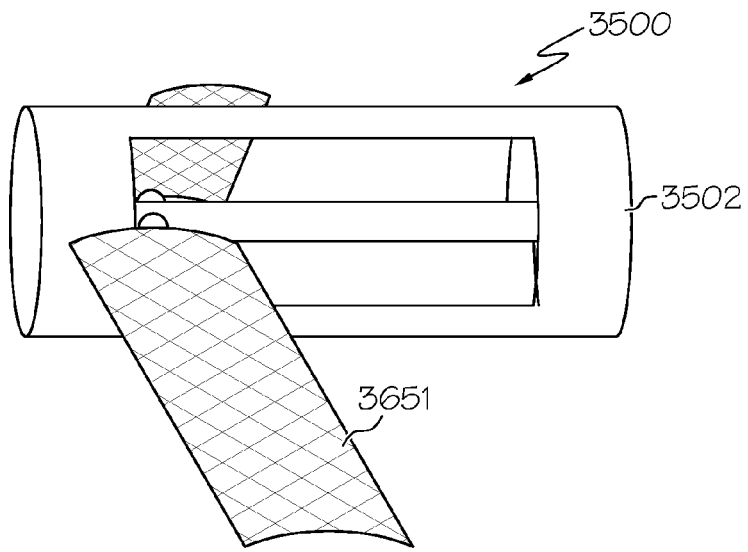
Figure 37:
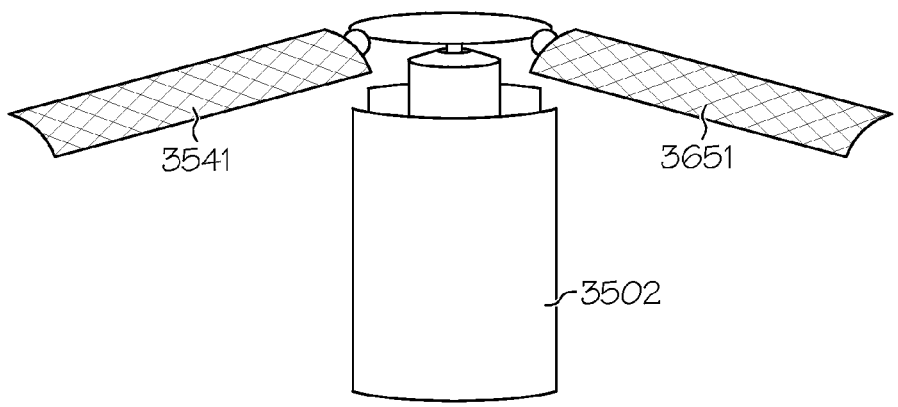

FIGS. 35-37 show additional embodiments for wings/rotors. In particular, FIG. 35 shows a container 3502 comprising a first portion 3549 and a second portion 3651, which formed from the actual sides of the container 3502. In one embodiment, the first portion 3549 and the second portion 365 extend away from the container 3502, as shown in FIG. 36. These extended portions 3549, 3651, as shown in FIG. 4, become the wings of the morphable UAV 3500. Alternatively, the extended portions 3549, 3651 can also become rotors as shown in FIG. 37.

Figure 38:
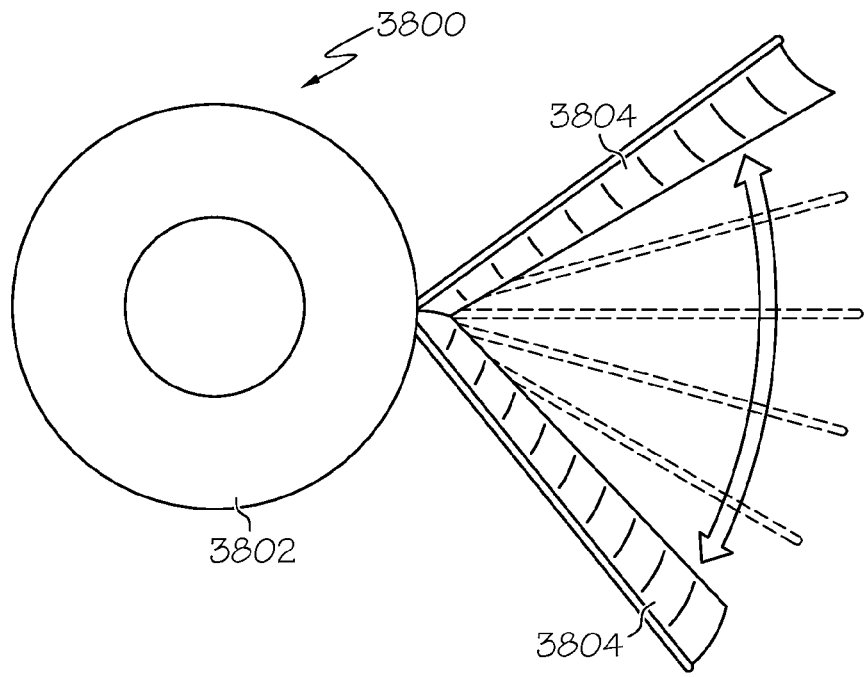
FIG. 38 shows one example of an unmanned aerial vehicle comprising flappable wings according to one embodiment of the present invention.
Figure 39:
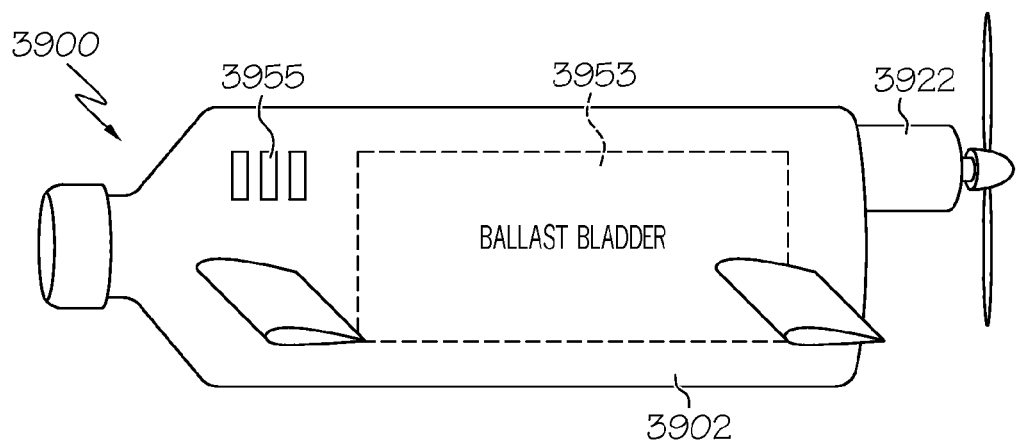
FIG. 39 shows one example of an unmanned vehicle that is submersible according to one embodiment of the present invention.

FIG. 38 shows another embodiment of a morphable UAV 3800. In particular, FIG. 28 shows a container 3802 comprising a set of wings 3804. These wings 3804 are configured to flap. In other words, the wings 3804 move in an up and down direction with respect to the ground. FIG. 39 shows a morphable UAV 3900 that can be deployed underwater. This morphable UAV 3900 can be anyone of the airborne UAVs discussed above that transforms into a submersible UAV or can be a standalone submersible UAV as well. In one embodiment, the morphable UAV 3900 comprises a propeller 3922 coupled to a rear portion 3903 of the container 3902. The morphable UAV 3900 also comprises an internal ballast bladder 3953 that fills with water to submerge the UAV 3900 or fills with air to add buoyancy to the UAV 3900. The UAV 3900 also comprises wings or stabilizers 3904 that stabilize the UAV 3900 in the water. Ballast inlets 3955 allow water or air to enter/leave the ballast bladder 3953.

Figure 40:
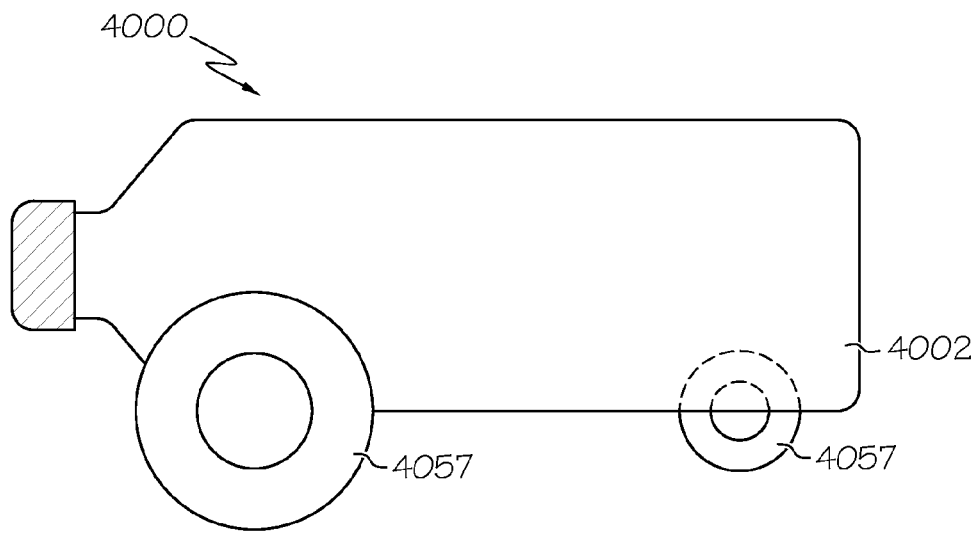
FIGS. 40-42 show various examples of unmanned aerial vehicles comprising different forms of locomotion according to one embodiment of the present invention.
Figure 41:
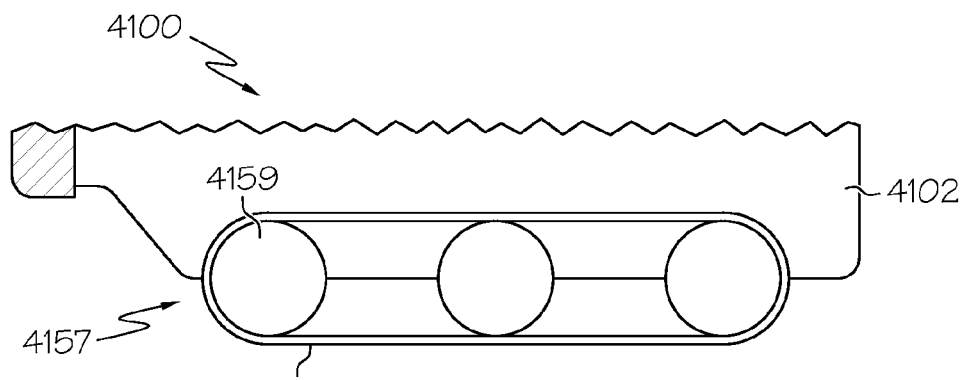
Figure 42:
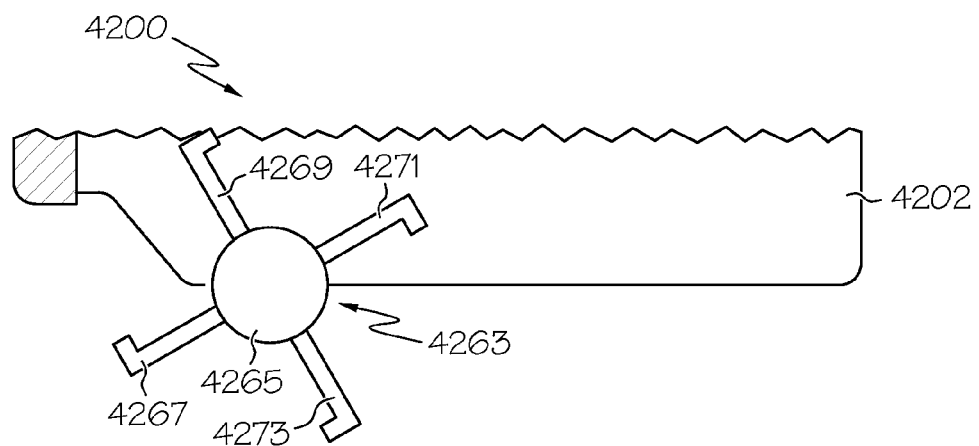

FIGS. 40-42 show various locomotion embodiments of a morphable UAV. These locomotion embodiments allow a morphable UAV to be deployed in one or more environments such as air, land, subterranean, and water. For example, FIG. 40 shows a set of wheels 4057 that can be stored/retracted within the container 4057 and extended from the container 4057 when in use. This allows the morphable UAV 4000 to traverse land. FIG. 41 shows morphable UAV 4100 comprising a container 4102 with one or more tread/track mechanisms 4157 which propels the morphable UAV 4100. The tread/track mechanism 4157 comprises a set of rotating members 4159 that rotate a tread/track 4161. The tread/track mechanism 4157, in one embodiment, is retractable so that it is stored within the container 4102 when not in use.

FIG. 42 shows a morphable UAV 4200 that comprises a container 4202 comprising one or more walking leg mechanism 4263. The walking leg mechanism 4263, in one embodiment, comprises a rotating member 4265 with a plurality of extensions 4267, 4269, 4271, 4273. The walking leg mechanism 4263 allows the morphable UAV 4200 to traverse rough terrain. For example, the walking leg mechanism 4263 allows the morphable UAV 4200 to climb over rocks and other objects. The walking leg mechanism 4263, in one embodiment, is retractable so that it is stored within the container 4202 when not in use.

FIGS. 43 and 44 show various embodiments of a drive shaft 4300. The drive shaft 4300 extends and retracts components to fit within a container in a fix-wing UAV and to work cooperatively with an insert 1133 such as that shown in FIG. 11. FIG. 43 shows the drive shaft 4300 comprising an outer housing 4370. A gear 4372 is mechanically coupled to the outer housing 4370 and to a threaded rod 4374 within the outer housing 4370. The threaded rod 4374 is mechanically coupled to a fixed nut 4376, which mechanically couples an inner shaft 4378 to the threaded rod 4374.

Figure 45:
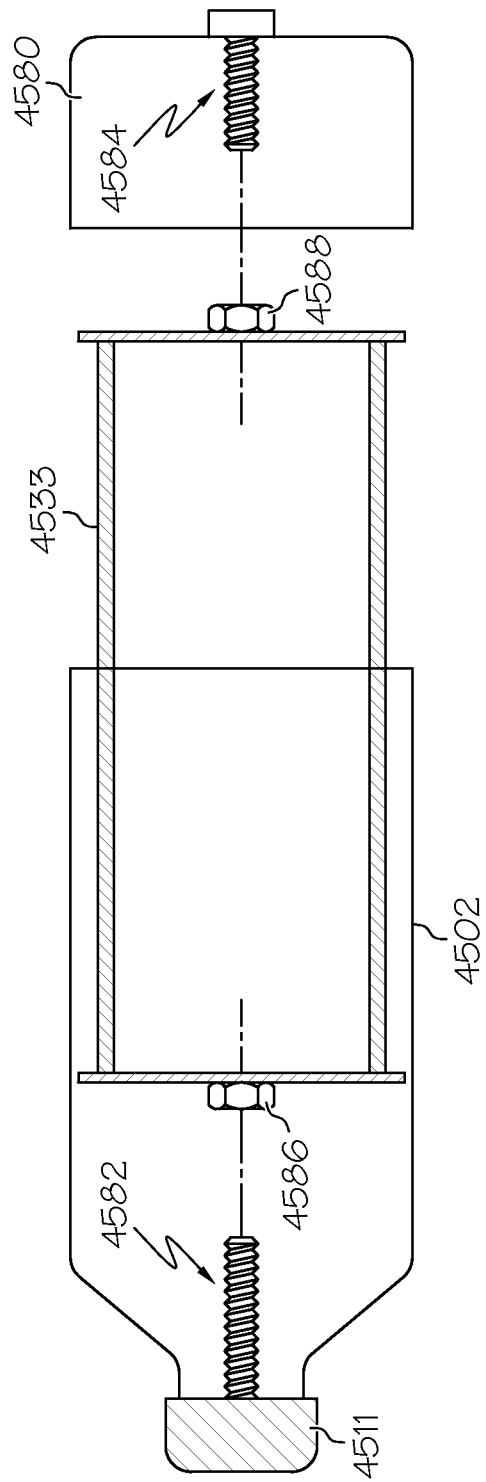
FIG. 45 shows one example of an insert comprising a drive mechanism for an unmanned aerial vehicle such as that shown in FIG. 10 according to one embodiment of the present invention.

In this embodiment, the drive shaft 4300 is configured to act as a linear actuator. As the drive gear turns 4372, the threaded rod 4374 transfers motion to the fixed nut 4376 attached to the inner shaft 4378. As a result, the inner shaft 4378 can extend and retract in/out of the outer housing 4370 accordingly. In one embodiment the retraction mechanism of FIGS. 43-44 is configured such that one end 4580 of the bottle forming the fuselage 4502 is removed and the insert 4533 is slide inside the bottle, as shown in FIG. 45. The insert 4533 is then connected by two hand points 4582, 4584 via one or more fastening mechanisms 4586, 4588: one at the bottle cap 4545 and the second at the bottom 4580 of the bottle. An insert 4533 can comprise all of the wings, motor, avionics, and the like to transform a container into a morphable UAV. In other words, the insert 4533 is modular and allows an ordinary container to be morphed into a UAV.

Figure 46:
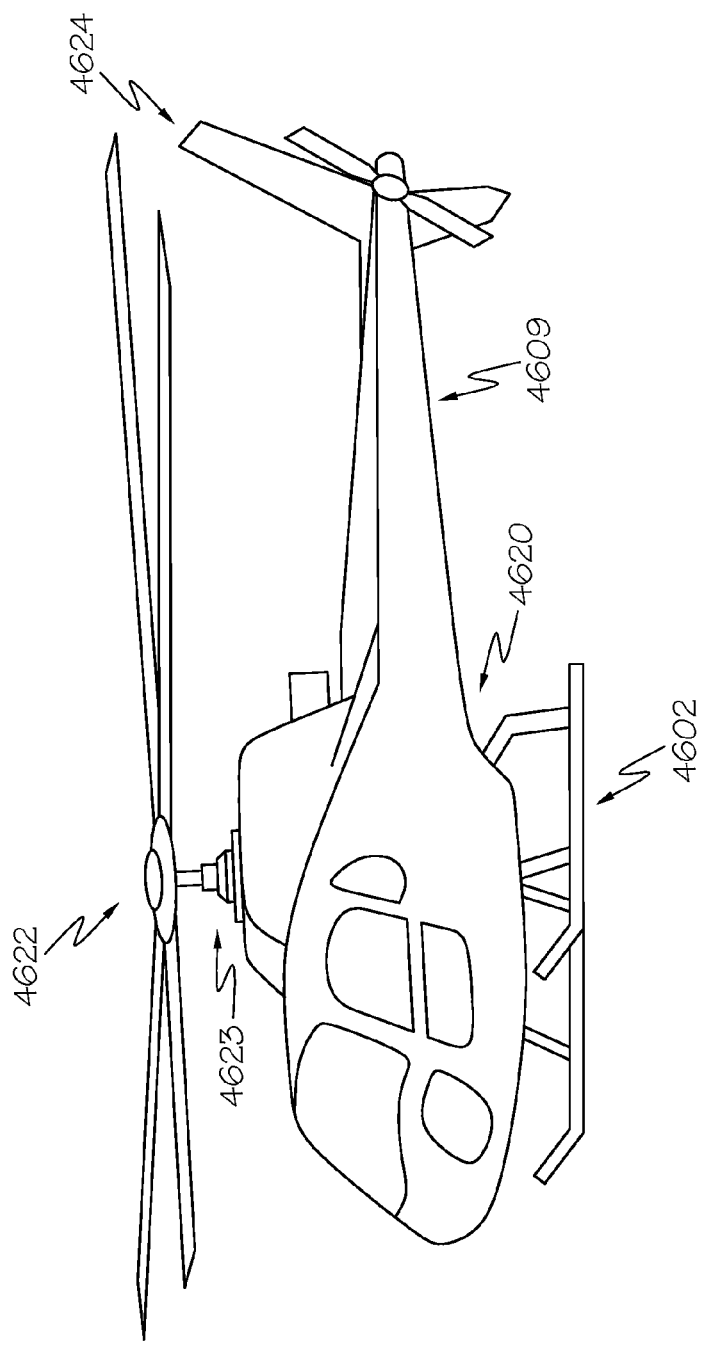
FIG. 46 is a generalized diagram of a rotary-wing aircraft according to the prior art.

FIG. 46 is a generalized diagram of a rotary-wing aircraft according to the prior art. Shown is a main rotor 4622 attached to a drive shaft 4623 which is mechanically coupled to a motor 4620 that is internal to the craft 4602. A tail boom 4609 and tail rotor 4624 are attached to the craft 4602.

Morphing Rotary Wing UAV

FIG. 47 illustrates a rotary-wing UAV 4700 according to one or more embodiments of the present invention. FIG. 47 shows the rotary-wing UAV 4700 with the rotor 4721, 4722 extended outside a beverage container 4702 according to one embodiment of the present invention. Shown is a rotor 4721, 4722 attached to a drive shaft 4723. This embodiment uses a two-blade system to provide stability without requiring a tail. However, various embodiments of the present invention are not limited to this embodiment.

The components 4790 of the rotary-wing UAV 4700 that morph a beverage container 4702 into a rotary-wing UAV 4700 have two positions. A first position for extending the components needed for lift and propulsion and second position for the avionics to be retracted to fit inside a beverage container 4702. In one embodiment, the components 4790 are a single unit 4725 that can be inserted into any beverage container 4702 of appropriate size. The beverage container 4702 comprises external trade dress and lettering to resemble a given consumer brand of beverage. In one embodiment, the beverage container 4702 is an actual drink container. Similar the fix-wing embodiment discussed above, the rotor(s) 4721, 4722 of the rotary wing UAV is retractable. For example, the rotors 4721, 4722, comprise a first position, which is open for use during flight, and a second position, which is retracted within the fuselage (e.g., retracted inside the beverage container 4702) when not in flight.

In one embodiment, the blades 4754, 4756 of the rotors 4721, 4721 are foldable as discussed above. Also, the drive shaft 4723 can be retracted into the beverage container 4702. In one embodiment, the motion of the drive shaft 4723 being retracted into the beverage container 4702 causes the rotors 4721, 4722 to fold so that they can fit within the beverage container 4702. Inside the body 4702 is an engine in 4720 that is mechanically coupled to the shaft 4723 for turning the retractable rotors 4721 and 4722. The engine 4720 is an electric engine and/or a gas engine. Other avionics controls, and sensors (not shown) that can be positioned inside the body 4725 include cameras, microphones, chemicals sensors, biological sensors, location sensors such as Global Positioning Satellite modules, heat sensors, and the like.

FIG. 48 is a picture of a rotary-wing UAV 4800. The rotary-wing UAV 4800, in the example of FIG. 48, has the rotor(s) 4821, 4822 extended and a motor 4820 and other avionics situated inside the beverage container 4802. Unlike the embodiment in FIG. 48, the beverage container 4802 is included with the rotary-wing craft. No separate body 4825 is needed.

Figure 50:
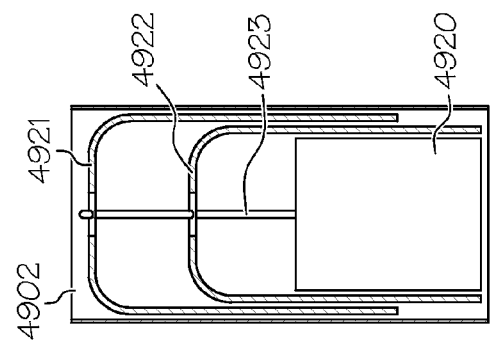
FIGS. 49-50 show various examples of a flexible rotor in a rotary-wing aircraft with the rotor shaft and electronics outside a packaging container according to one embodiment of the present invention.
Figure 49:
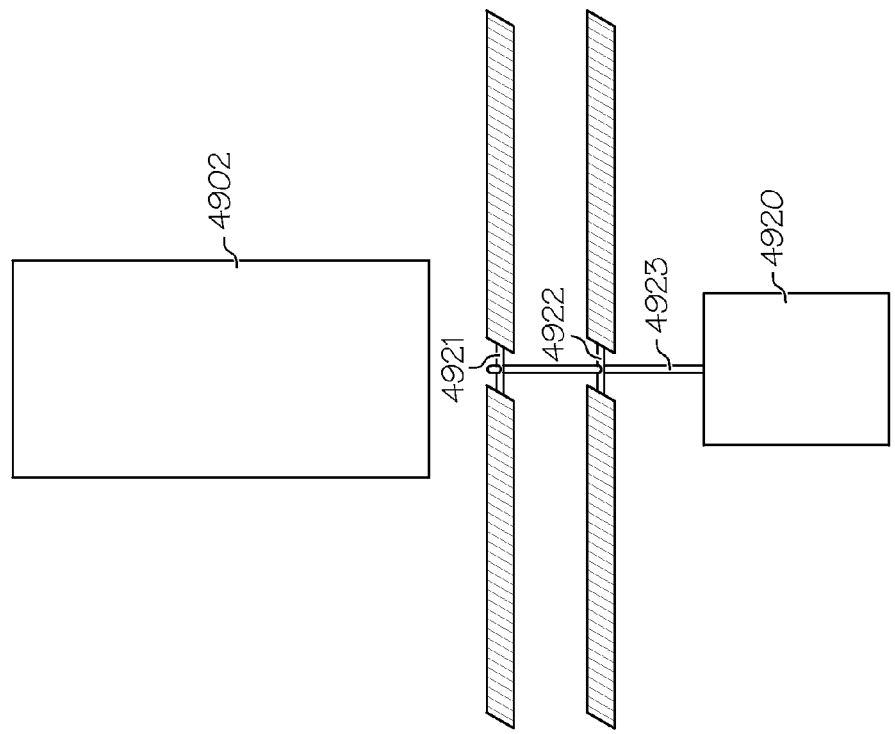

The rotor(s) 4721, 4722 and shaft are designed to extend and retract using a variety of mechanisms. FIGS. 49-50 illustrate a few embodiments. For example, FIG. 49 illustrates a flexible rotor(s) 4921, 4922 with the rotor shaft 4923 and motor/electronics 4920 outside a beverage container 4902. The flexible rotor(s) 4921, 4922, rotor shaft 4923, and motor/electronics 4920 are configured to fit inside of the beverage container 4902, as shown in FIG. 50. As can be seen in FIG. 50, the flexible rotor(s) 4921, 4922 bend to conform to the inner dimension(s) of the beverage container 4902.

Figure 52:
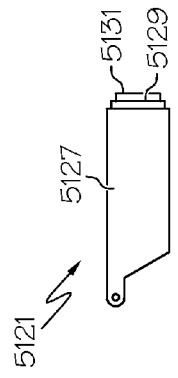
FIGS. 51-56 show various examples of a telescoping, hinged, and bendable rotor assemblies in a rotary-wing aircraft according to one embodiment of the present invention.
Figure 54:
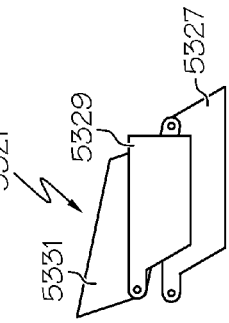
Figure 56:
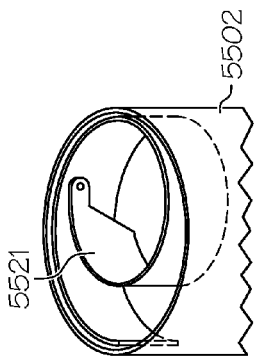
Figure 51:
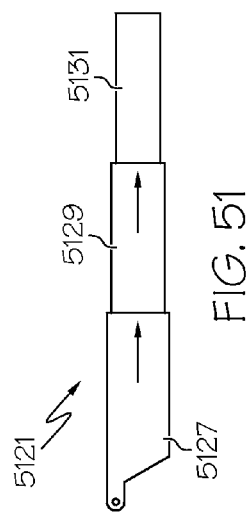
Figure 53:
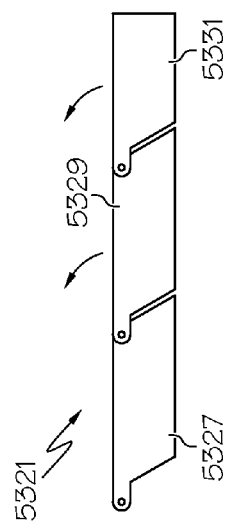
Figure 55:
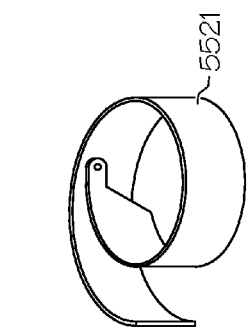

FIGS. 51-56 illustrate a variety of embodiments for the rotor(s). In one embodiment, a rotor 5121 is an extendable or telescopic rotor. FIG. 51 shows a rotor 5121 comprising a plurality of sections 5127, 5129, 5131. One of more of these sections 5127, 5129, 5131 can retract into one or more of the other sections 5127, 5129, 5131 and/or slide over one or more of the other sections 5127, 5129, 5131, as shown in FIG. 52. FIG. 53 shows a hinged rotor 5321 in an extended position. The hinged rotor 5321 comprises a plurality of sections 5327, 5329, 5331. One or more of these sections 5327, 5329, 5331 are pivotably coupled to at least one other of these sections 5327, 5329, 5331. This pivotably coupling allows these sections 5327, 5329, 5331 to be retracted onto each other as shown in FIG. 54. FIG. 555 shows a foldable/bendable rotor 5521 that is able to conform to the inner dimensions of a beverage container 5502, as shown in FIG. 56.

Figure 58:
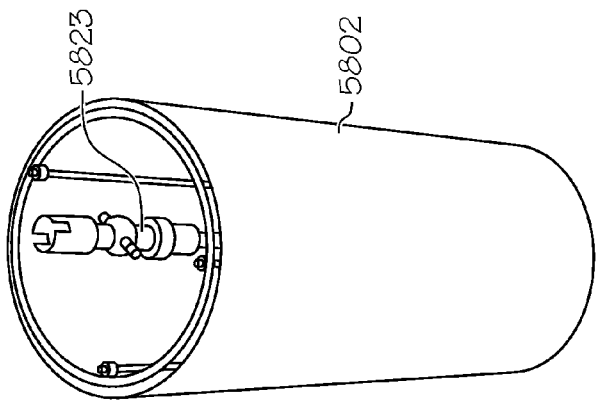
FIG. 58 shows one example of a rotary-wing aircraft with the rotor shaft, motor, and other avionics retracted inside a packaging container according to one embodiment of the present invention.
Figure 57:
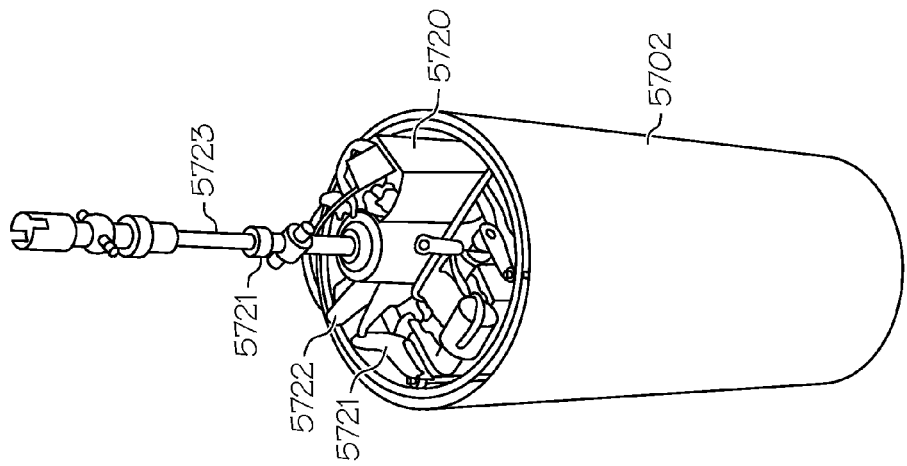
FIG. 57 shows one example of a rotary-wing aircraft with the rotor shaft extended outside a packaging container according to one embodiment of the present invention.

FIG. 57 illustrates one embodiment of a rotary-wing UAV 5700 with the rotor shaft 5723 extended outside a Monster® beverage container 5702. In particular, FIG. 57 shows the shaft 5723 extended upwards out of the container 5702. As can be seen in FIG. 57, the engine/avionics/sensors 5720 are partially situated within the container 5702 and ready for flight. The rotors are not shown as being attached to the shaft 5723 in FIG. 57. In one embodiment, the rotor(s) 5721, 5722 are detachable and can be stored within the beverage container 5702, as shown in FIG. 57. Alternatively, the rotor(s) 5721, 5722 can fold/bend/retract/pivot so that they can fit within the beverage container 5702, as discussed above. FIG. 58 shows the shows the shaft 5823 retracted into the container 5802. As can be seen in FIG. 58, the engine/avionics/sensors situated within the Monster® beverage container 5802. It should be noted that the engine/avionics/sensors 5720 of FIG. 57 can also reside within the beverage container 5802, as shown in FIG. 58, when ready for flight as well. The shaft 5823, in this embodiment, is able to extend to a distance out of the container 5802 so that the rotors are able operate and give the container 5802 flight.

Figure 59:
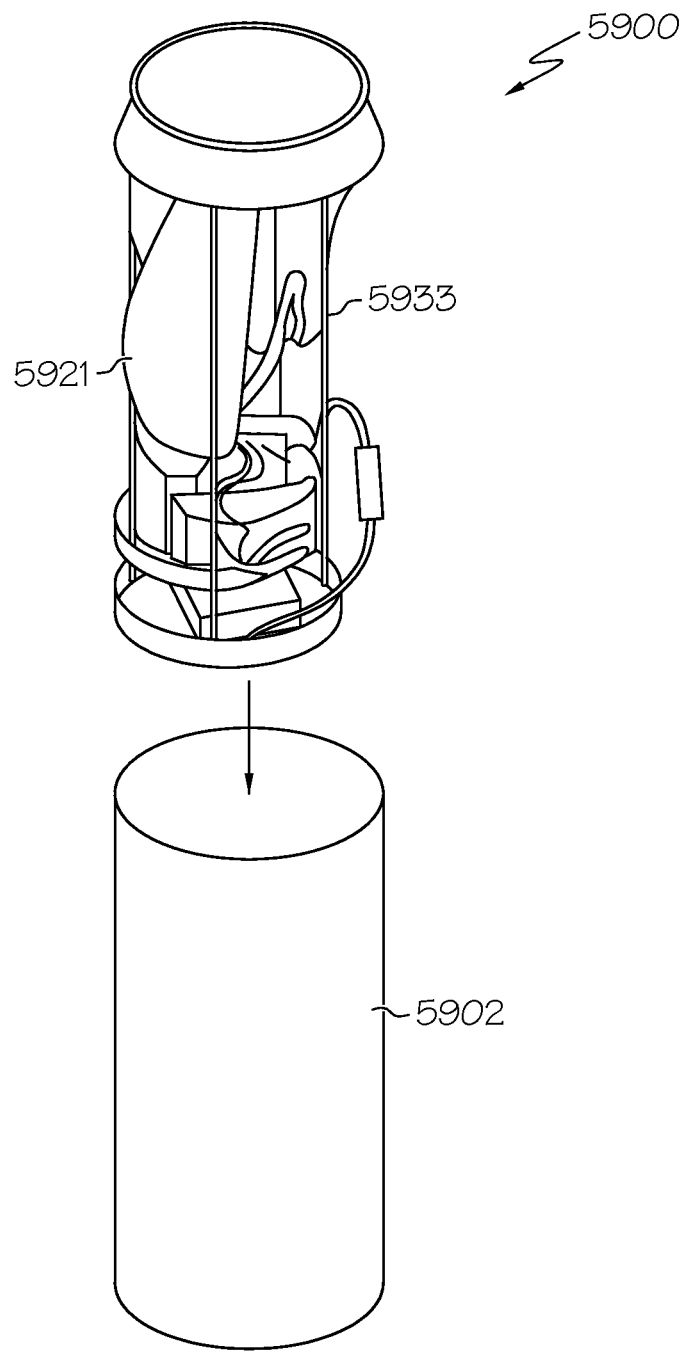
FIG. 59 shows one example of a rotary-wing aircraft with an insert outside a packaging container with hinged wings in a retracted position according to one embodiment of the present invention.
Figure 60:
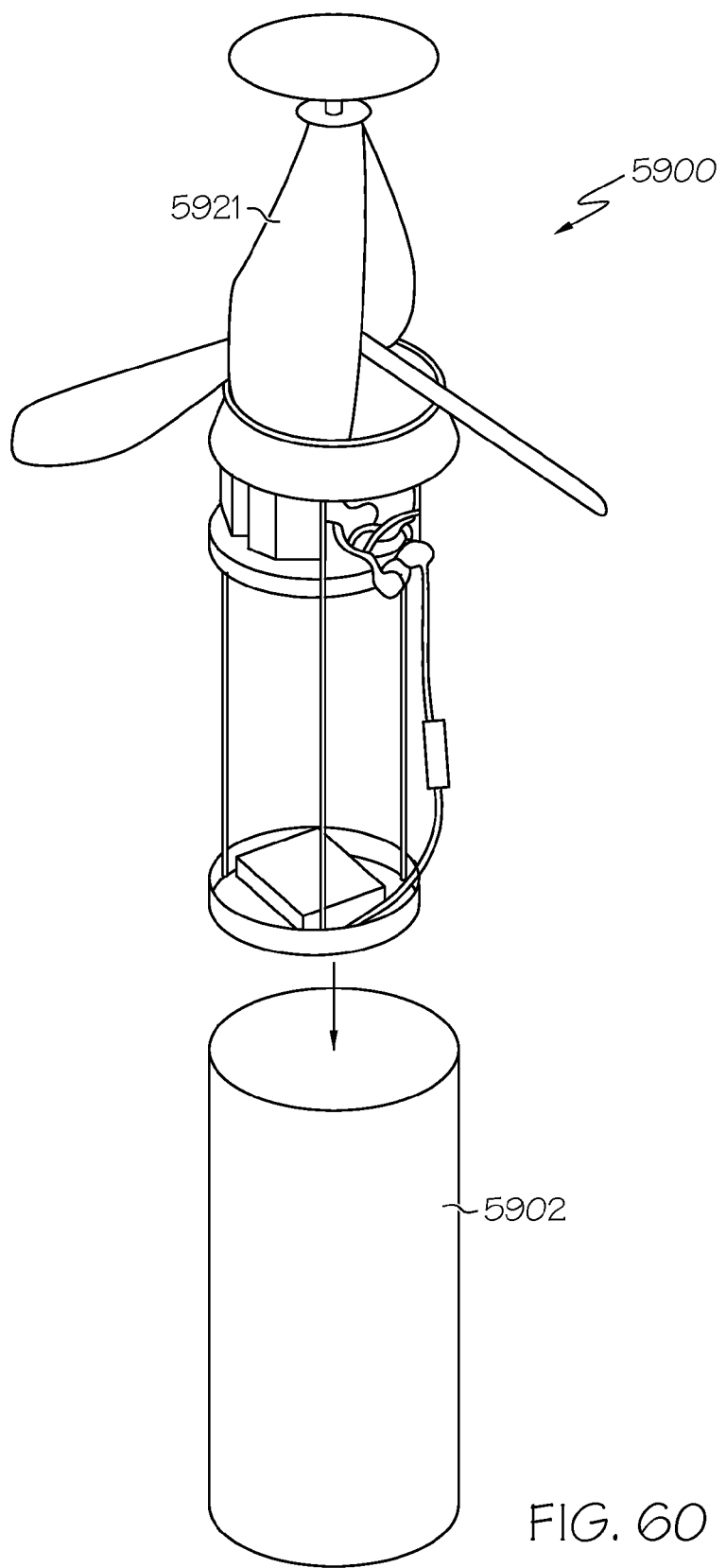
FIG. 60 shows one example of a rotary-wing aircraft with an insert outside a packaging container with hinged wings in a semi-extended position according to one embodiment of the present invention.
Figure 62:
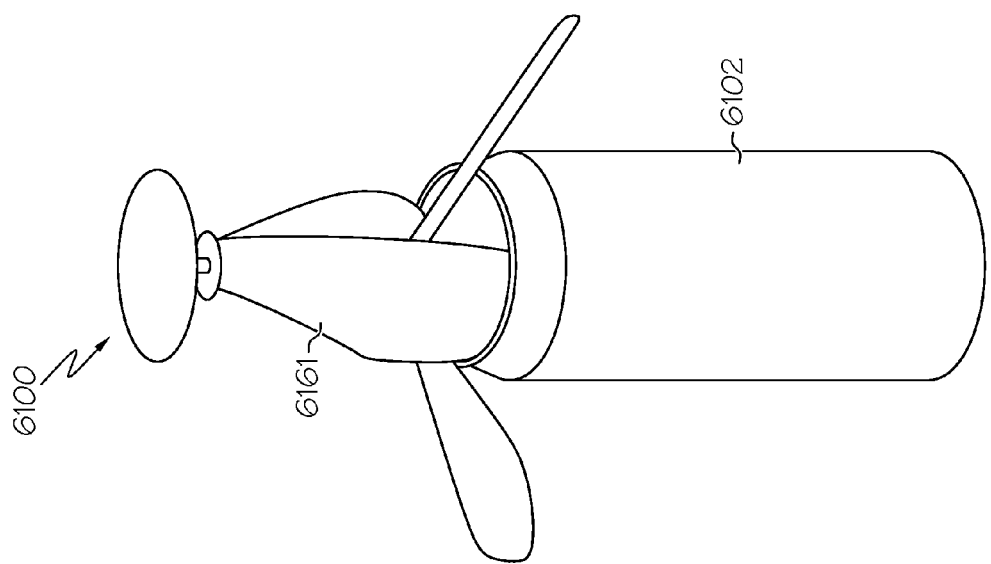
FIG. 62 shows one example of a rotary-wing aircraft with an insert inside a packaging container with hinged wings in a semi-extended position according to one embodiment of the present invention.
Figure 61:
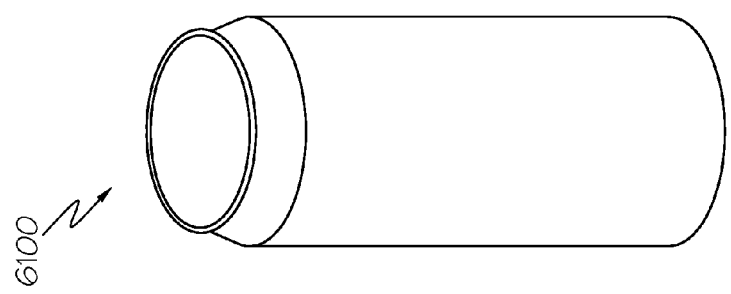
FIG. 61 shows one example of a rotary-wing aircraft with an insert inside a packaging container with hinged wings in a retracted position according to one embodiment of the present invention.
Figure 64:
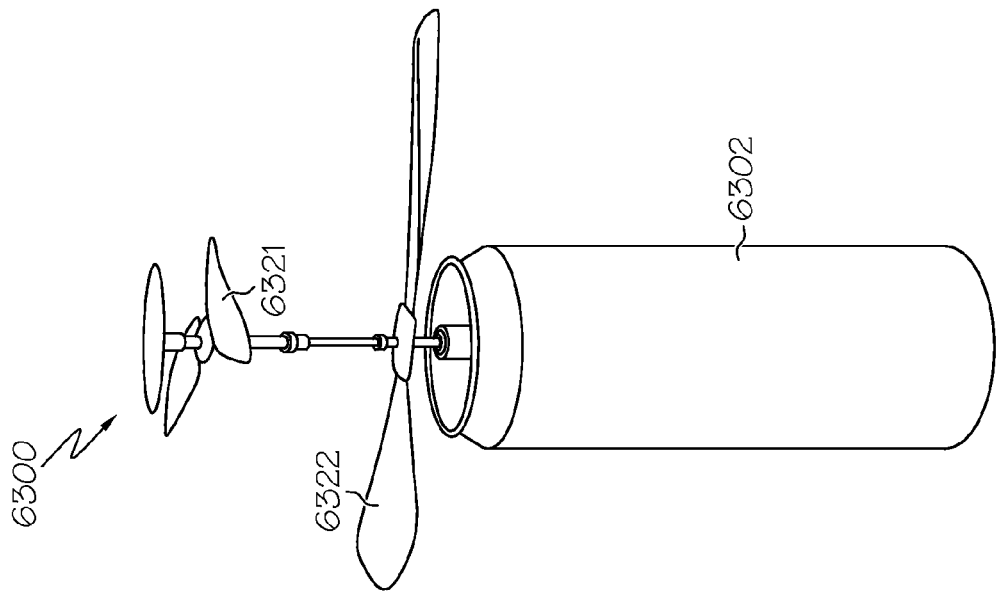
FIGS. 63 and 64 show examples of a rotary-wing aircraft with insert inside a packaging container with hinged wings in a fully extended position according to one embodiment of the present invention.
Figure 63:
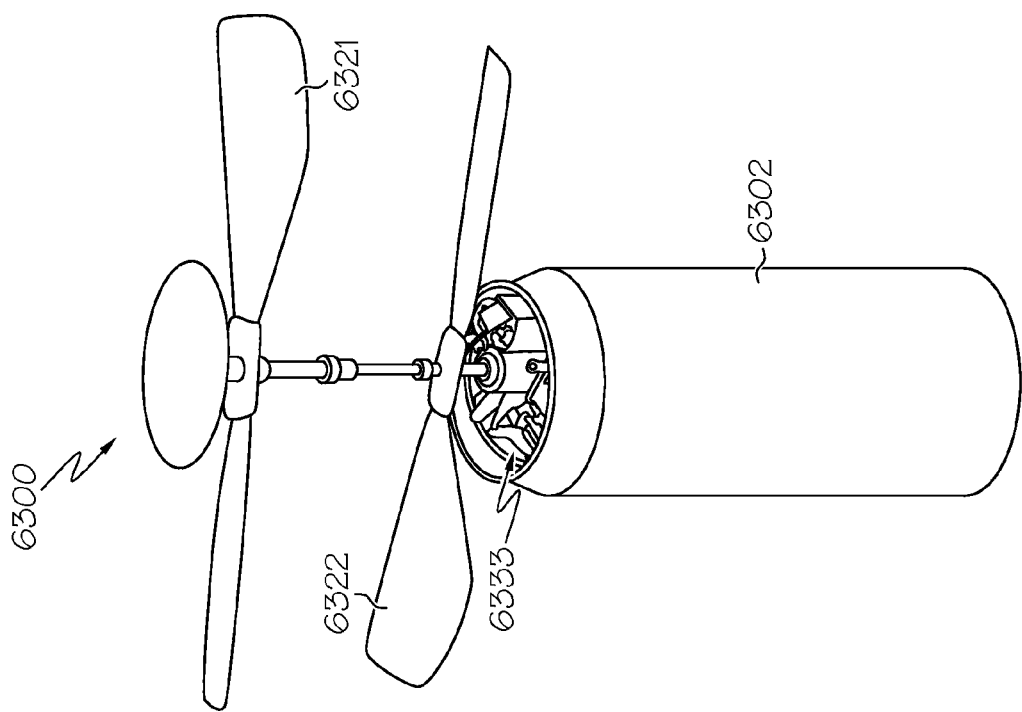

FIG. 59 shows another embodiment of a rotary-wing UAV 5900. In particular, FIG. 59 the insert 5933 outside of the container 5902 with hinged wings/blades/rotors 5921 in a retracted position. FIG. 60 shows the hinged wings/blades/rotors 5921 in a semi-extended position according to one embodiment of the present invention. FIG. 61 illustrates one embodiment of a rotary-wing UAV 6100 with the insert inside the container 6102 with hinged wings/blades/rotors 6121 in a retracted position. FIG. 62 shows the wings/blades/rotors of the UAV 6100 in a semi-extended position according to one embodiment of the present invention. FIGS. 63 and 64 illustrate one embodiment of a rotary-wing UAV 6300 with the insert 6333 inside the container 6302. FIGS. 63 and 64 also shows the hinged wings/blades/rotors 6321, 6322 in a fully extended position according to one embodiment of the present invention.

Non Limiting Examples

The technology of a fix-wing and rotary-wing craft morphs from a beverage container. Although the container is shown as part of the UAV, it is important to note that a single unit that can inserted into any actual beverage container of appropriate size. Therefore, the technology uses the beverage container to avoid detection when not in flight.

Although the UAVs described herein can have a variety of shapes and configurations, it is important to note other types of UAVs including fixed-wing, rotary-wing, flapping-wing, ducted-fan type are within the true scope and spirit of the present invention.

Moreover, although a beverage container have been described, it is important to note that containers including pipes, boxes and other shapes may be advantageously used with the present invention.

Further, even though a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A morphing rotary-wing unmanned aerial vehicle that transforms from a beverage container to an aircraft, comprising:

a substantially cylindrical fuselage comprising a shape configured, dimensioned, and sized as a hand-held beverage container with a first end and a second end, the beverage container with an outer surface containing color, trade dress, and lettering substantially identical to a given consumer brand of a beverage, thereby appearing substantially identical to the beverage container when not in flight;

at least one rotor coupled to the first end, the at least one rotor comprising a first position where the at least one rotor is extended outwards using at least one mechanical drive mechanism from the fuselage and a second position where the at least one rotor is retracted inwards using the mechanical drive mechanism towards the fuselage, wherein in the second position, the rotor is completely inside the beverage container, thereby appearing only as the beverage container; and at least one of an electric-power engine, a gas-powered engine, and a jet-powered engine mechanically coupled to the at least one rotor, wherein the engine is enclosed within the fuselage and rotates the at least one rotor relative to the cylindrical fuselage in order to provide lift and propulsion.

2. The rotary-wing unmanned aerial vehicle of claim 1, wherein the at least one rotor is retracted inwards into an inner portion of the fuselage.

3. The rotary-wing unmanned aerial vehicle of claim 1, wherein the fuselage is formed from the beverage container.

4. The rotary-wing unmanned aerial vehicle of claim 1, wherein the at least one rotor comprises plurality of members, wherein at least one of the plurality of members is pivotably coupled to at least one other of the plurality of members.

5. The rotary-wing unmanned aerial vehicle of claim 1, wherein the beverage container is a soft drink container.

6. The rotary-wing unmanned aerial vehicle of claim 1, wherein the fuselage comprises external trade dress and lettering substantially similar to a given consumer brand of beverage.

7. The rotary-wing unmanned aerial vehicle of claim 1, wherein the fuselage comprises a camera coupled thereto.

8. The rotary-wing unmanned aerial vehicle of claim 1, wherein the fuselage comprises a microphone coupled thereto.

9. The rotary-wing unmanned aerial vehicle of claim 1, wherein the fuselage comprises a chemical sensor coupled thereto.

10. The rotary-wing unmanned aerial vehicle of claim 1, wherein the fuselage comprises a biological sensor coupled thereto.

11. The rotary-wing unmanned aerial vehicle of claim 1, wherein the fuselage comprises a heat sensor coupled thereto.

12. The rotary-wing unmanned aerial vehicle of claim 1, wherein the fuselage comprises an explosive device coupled thereto.

13. The rotary-wing unmanned aerial vehicle of claim 1, wherein the fuselage comprises a positioning device coupled thereto.

14. The rotary-wing unmanned aerial vehicle of claim 1, wherein the fuselage comprises at least one flare coupled thereto.

15. The rotary-wing unmanned aerial vehicle of claim 1, wherein the fuselage comprises a smoke generator coupled thereto.

16. The rotary-wing unmanned aerial vehicle of claim 1, wherein the at least one rotor is made of resilient material so as to be bendable in order to fit inside the fuselage.

17. A morphing rotary-wing unmanned aerial vehicle that transforms from a consumer packaging container to an aircraft, comprising:

a fuselage comprising a shape configured and sized as a consumer packaging container with a first end and a second end, the consumer packaging container with an outer surface containing color, trade dress and lettering substantially identical to a given consumer brand of a food packaging;

at least one rotor coupled to the first end, the at least one rotor comprising a first position where the at least one rotor is extended outwards using at least one mechanical drive mechanism from the fuselage and a second position where the at least one rotor is retracted inwards using the mechanical drive mechanism towards the fuselage, wherein in the second position, the rotor is completely inside the consumer packaging container, thereby appearing only as the consumer packaging container; and at least one of an electric-power engine, a gas-powered engine, and a jet-powered engine mechanically coupled to the at least one rotor, wherein the engine is enclosed within the fuselage and rotates the at least one rotor relative to the fuselage in order to provide lift and propulsion.

18. The rotary-wing unmanned aerial vehicle of claim 17, wherein the at least one rotor is retracted inwards into an inner portion of the fuselage.

19. The rotary-wing unmanned aerial vehicle of claim 17, wherein the fuselage is formed from the consumer packaging container.

20. The rotary-wing unmanned aerial vehicle of claim 17, wherein the consumer packaging container is a soft drink container.

21. The rotary-wing unmanned aerial vehicle of claim 17, wherein the fuselage comprises external trade dress and lettering substantially similar to a given consumer brand of beverage.

22. The rotary-wing unmanned aerial vehicle of claim 17, wherein the fuselage comprises a camera coupled thereto.

23. The rotary-wing unmanned aerial vehicle of claim 17, wherein the fuselage comprises a microphone coupled thereto.

24. The rotary-wing unmanned aerial vehicle of claim 17, wherein the fuselage comprises a chemical sensor coupled thereto.

25. The rotary-wing unmanned aerial vehicle of claim 17, wherein the fuselage comprises at least one of a biological sensor and a heat sensor coupled thereto.

26. The rotary-wing unmanned aerial vehicle of claim 17, wherein the fuselage comprises a positioning device coupled thereto.

27. The rotary-wing unmanned aerial vehicle of claim 17, wherein the fuselage comprises at least one of an explosive device, a flare, and a smoke generator coupled thereto.

28. The rotary-wing unmanned aerial vehicle of claim 17, wherein the at least one rotor is made of resilient material so as to be bendable in order to fit inside the fuselage.

* * * * *